United States Patent
Tanaka et al.

(10) Patent No.: US 12,207,202 B2
(45) Date of Patent: *Jan. 21, 2025

(54) COMMUNICATION DEVICE

(71) Applicant: Sony Group Corporation, Tokyo (JP)

(72) Inventors: Yusuke Tanaka, Tokyo (JP); Hiroshi Shigeno, Kanagawa (JP); Takanobu Ohnuma, Kanagawa (JP); Koki Iwai, Kanagawa (JP); Riku Inada, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,307

(22) Filed: Nov. 21, 2023

(65) Prior Publication Data

US 2024/0089864 A1    Mar. 14, 2024

Related U.S. Application Data

(63) Continuation of application No. 17/609,785, filed as application No. PCT/JP2020/019044 on May 13, 2020, now Pat. No. 11,849,404.

(30) Foreign Application Priority Data

May 27, 2019    (JP) .................. 2019-098247

(51) Int. Cl.
    *H04W 52/24*    (2009.01)
(52) U.S. Cl.
    CPC .................. *H04W 52/24* (2013.01)

(58) Field of Classification Search
    CPC ..................... H04W 52/24; H04L 1/0026
    See application file for complete search history.

(56) References Cited

U.S. PATENT DOCUMENTS 11,528,700 B2 *   12/2022   Maeda ............... H04W 52/146
11,849,404 B2 *   12/2023   Tanaka ............... H04W 84/12
(Continued)

FOREIGN PATENT DOCUMENTS

JP    2002-77039 A    3/2002
JP    2010-45547 A    2/2010
(Continued)

OTHER PUBLICATIONS

International Search Report and Written Opinion mailed on Aug. 4, 2020, received for PCT Application PCT/JP2020/019044, Filed on May 13, 2020, 9 pages.

*Primary Examiner* — Hai V Nguyen
(74) *Attorney, Agent, or Firm* — XSENSUS LLP

(57) ABSTRACT

The present technology relates to a communication device capable of improving a system throughput.

Provided is a communication device including a control unit that transmits a second signal including a transmission request for a first signal for measuring reception power or propagation loss to another communication device, receives the first signal transmitted from the other communication device, measures the reception power or the propagation loss on the basis of the received first signal, and controls transmission power on the basis of the measured reception power or propagation loss. The present technology can be applied to, for example, a wireless LAN system.

20 Claims, 16 Drawing Sheets

(56) References Cited

U.S. PATENT DOCUMENTS

| | | | |
|---|---|---|---|
| 2002/0022495 A1* | 2/2002 | Choi | H04W 52/265 |
| | | | 455/69 |
| 2011/0189988 A1* | 8/2011 | Morimoto | H04W 36/30 |
| | | | 455/422.1 |
| 2018/0020411 A1* | 1/2018 | Itagaki | H04W 52/283 |
| 2018/0049136 A1* | 2/2018 | Jiang | H04W 52/24 |

FOREIGN PATENT DOCUMENTS

| | | |
|---|---|---|
| JP | 6262756 B2 | 1/2018 |
| WO | 2016/143209 A1 | 9/2016 |
| WO | 2018/159794 A1 | 9/2018 |

* cited by examiner

FIG. 8

| Coordinated Measurement & TPC Capability | Acceptable Interference | Acceptable Interfered STA Num. | Threshold for TPC |

FIG. 9

| Common Tx Power | Test Signal Identifier | Coarse Resource Allocation | Test Signal Timing |
|---|---|---|---|

COMMUNICATION DEVICE

CROSS-REFERENCE TO RELATED APPLICATIONS

The present application is a continuation of U.S. application Ser. No. 17/609,785 filed Nov. 9, 2021, which is based on PCT filing PCT/JP2020/019044, filed May 13, 2020, which claims priority to JP 2019-098247, filed May 27, 2019, the entire contents of each are incorporated herein by reference.

TECHNICAL FIELD

The present technology relates to a communication device, and particularly to a communication device capable of improving a system throughput.

BACKGROUND ART

In recent years, with the spread of a wireless local area network (LAN) system, mutual interference between networks due to densification of wireless LAN mounted devices has become a problem. Due to this mutual interference, problems such as loss of a communication opportunity and deterioration in communication quality of the wireless LAN mounted device occur, and various technologies have been proposed for its countermeasure.

For example, a spatial reuse technology is known as a technology for solving mutual interference due to densification. This spatial reuse technology is a technology in which in a case where it is necessary to detect first communication by another terminal and perform transmission control, by increasing a signal detection threshold so that this first communication can be ignored and decreasing transmission power by that amount, second communication can be performed while suppressing interference given to the first communication.

Furthermore, for example, Patent Document 1 discloses a technology in which a base station (access point (AP)) collects information regarding a signal detection threshold, an amount of interference received, and a channel measurement result from a subordinate terminal (station (STA)), and controls transmission power of the subordinate terminal (STA).

CITATION LIST

Patent Document

Patent Document 1: Japanese Patent No. 6262756

SUMMARY OF THE INVENTION

Problems to be Solved by the Invention

However, in the spatial reuse technology described above, since the second communication receives interference from the first communication and decreases the transmission power, there is a problem that a signal interference noise ratio (SINR) is significantly reduced and a throughput is not improved. Furthermore, since the first communication does not perform transmission power control, in a case where a distance between base stations (APs) or between networks (basic service sets (BSSs)) is shortened, a signal detection threshold with which the first communication can be ignored exceeds a threshold defined by law and cannot be ignored, and there is a possibility that the second communication cannot be performed.

Furthermore, in the technology disclosed in Patent Document 1 described above, transmission power control of the terminal (STA) is performed without considering an amount of interference given to a terminal (STA) of an adjacent network (BSS). Therefore, in a case where this technology is adopted, particularly in a densified environment in which the distance between the base stations (APs) or between the networks (BSSs) is shortened, the transmission power is unilaterally increased in order to increase a SINR or a transmission opportunity of its own network (BSS). Accordingly, transmission power of the terminals (STAs) of the entire system increases, and transmission suppression is significantly increased and the SINR is deteriorated.

As described above, the current technology is not sufficient as a countermeasure for mutual interference between the networks due to the densification of the wireless LAN mounted devices, and it is assumed that the densification and the mutual interference become more serious as the distance between the base stations (APs) or between the networks (BSSs) becomes shorter. Therefore, it is required to improve the system throughput by reducing interference given to the other network (BSS) and improving the SINR of desired communication in a densified environment.

The present technology has been made in view of such a situation, and makes it possible to improve a system throughput.

Solutions to Problems

A communication device according to a first aspect of the present technology is a communication device including: a control unit that transmits a second signal including a transmission request for a first signal for measuring reception power or propagation loss to another communication device, receives the first signal transmitted from the another communication device, measures the reception power or the propagation loss on the basis of the received first signal, and controls transmission power on the basis of the measured reception power or propagation loss.

In the communication device according to the first aspect of the present technology, the second signal including the transmission request for the first signal for measuring the reception power or the propagation loss is transmitted to the another communication device, the first signal transmitted from the another communication device is received, the reception power or the propagation loss is measured on the basis of the received first signal, and the transmission power is controlled on the basis of the measured reception power or propagation loss.

A communication device according to a second aspect of the present technology is a communication device including: a control unit that performs control to receive a second signal transmitted from a third another communication device and including a transmission request for a first signal for measuring reception power or propagation loss, and transmit a third signal including the transmission request for the first signal to a first another communication device on the basis of the received second signal.

In the communication device according to the second aspect of the present technology, the second signal transmitted from the third another communication device and including the transmission request for the first signal for measuring the reception power or the propagation loss is received, and the third signal including the transmission request for the first signal is transmitted to the first another communication device on the basis of the received second signal.

A communication device according to a third aspect of the present technology is a communication device including: a control unit that performs control to receive a third signal transmitted from a second another communication device and including a transmission request for a first signal for measuring reception power or propagation loss, and transmit the first signal to a third another communication device on the basis of the received third signal.

In the communication device according to the third aspect of the present technology, the third signal transmitted from the second another communication device and including the transmission request for the first signal for measuring the reception power or the propagation loss is received, and the first signal is transmitted to the third another communication device on the basis of the received third signal.

Note that the communication devices according to the first to third aspects of the present technology may be independent devices or may be internal blocks constituting one device.

BRIEF DESCRIPTION OF DRAWINGS

FIG. 8 is a diagram illustrating an example of a format of a signal for an initial setup phase.

FIG. 9 is a diagram illustrating an example of a format of a test signal request signal.

MODES FOR CARRYING OUT THE INVENTION

Hereinafter, embodiments of the present technology will be described with reference to the drawings. Note that the description will be given in the following order.

1. Configuration of Wireless Communication System
2. First Embodiment
3. Second Embodiment
4. Modified Examples 1. Configuration of Wireless Communication System Configuration Example of Wireless Communication System FIG. 1 illustrates a first example of a configuration of a wireless communication system to which the present technology is applied.

Figure 1:
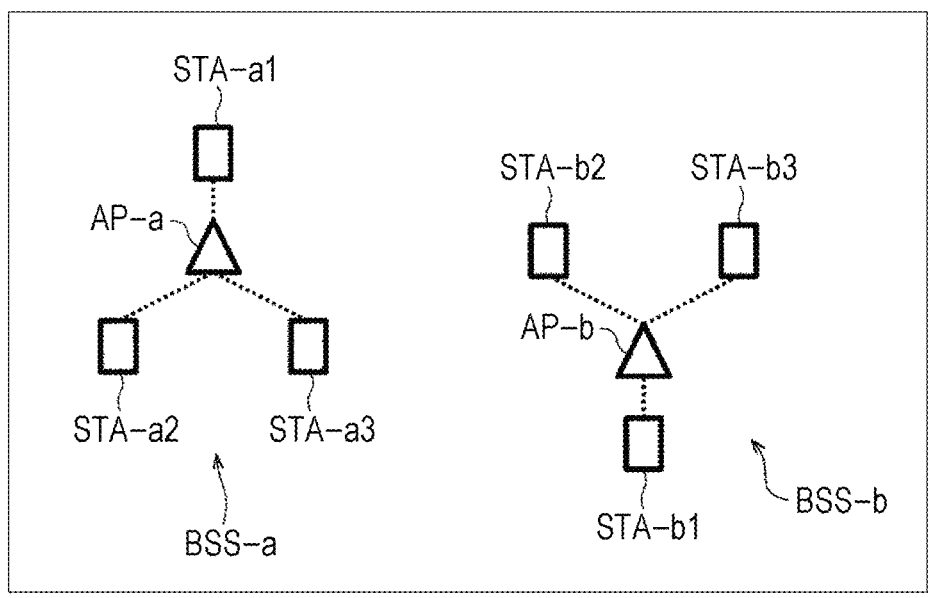
FIG. 1 is a diagram illustrating a first example of a configuration of a wireless communication system to which the present technology is applied.

The wireless communication system in FIG. 1 is a system of a wireless local area network (LAN) constituted of a plurality of networks (basic service sets (BSSs)) each including a base station (access point (AP)) and subordinate terminals (stations (STAs)) connected to the base station.

In FIG. 1, a base station AP-a and terminals STA-a1, STA-a2, and STA-a3 connected to the base station AP-a constitute a network BSS-a. Furthermore, a base station AP-b and terminals STA-b1, STA-b2, and STA-b3 connected to the base station AP-b constitute a network BSS-b.

Note that a broken line connecting the base station AP-a and each of the terminals STA-a1 to STA-a3 and a broken line connecting the base station AP-b and each of the terminals STA-b1 to STA-b3 indicate connection. Furthermore, the base station AP-a and the base station AP-b are installed at a distance capable of communicating with each other.

Configuration Example of Communication Device

Figure 2:
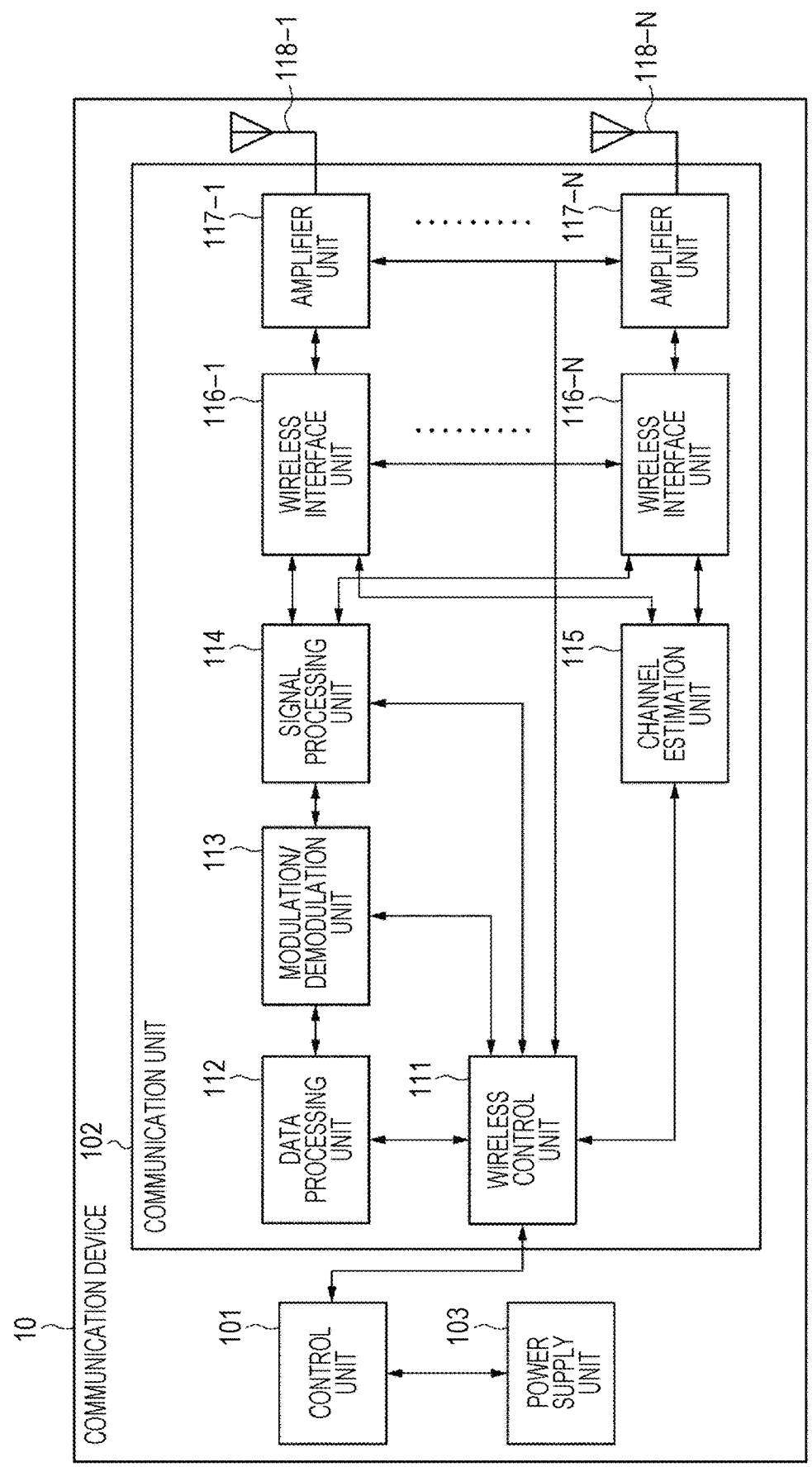
FIG. 2 is a block diagram showing a configuration example of an embodiment of a communication device to which the present technology is applied.

FIG. 2 illustrates a configuration example of an embodiment of a communication device (wireless communication device) to which the present technology is applied.

The communication device 10 illustrated in FIG. 2 is configured as the base station AP or the subordinate terminal STA in the wireless communication system of FIG. 1.

In FIG. 2, the communication device 10 includes a control unit 101, a communication unit 102, and a power supply unit 103. Furthermore, the communication unit 102 includes a wireless control unit 111, a data processing unit 112, a modulation/demodulation unit 113, a signal processing unit 114, a channel estimation unit 115, wireless interface units 116-1 to 116-N (N: an integer of 1 or more), and amplifier units 117-1 to 117-N (N: an integer of 1 or more).

Moreover, in the communication device 10, antennas 118-1 to 118-N (N: an integer of 1 or more) are provided for (the amplifier units 117-1 to 117-N of) the communication unit 102.

The control unit 101 and the wireless control unit 111 are configured, for example, as a control device such as a processor and the like such as a CPU, a microprocessor, and the like, and control operation of each unit. Note that the control unit 101 and the communication unit 102 may be configured as one integrated circuit (large scale integration (LSI)).

The control unit 101 and the wireless control unit 111 exchange information (data) between blocks. The communication unit 102 performs processing regarding wireless communication in accordance with the control of the control unit 101 and the wireless control unit 111.

In other words, the control unit 101 and the wireless control unit 111 perform packet scheduling in the data processing unit 112 and parameter setting in the modulation/ demodulation unit 113 and the signal processing unit 114 of the communication unit 102. Furthermore, the control unit 101 and the wireless control unit 111 perform parameter setting and transmission power control of the wireless interface units 116-1 to 116-N and the amplifier units 117-1 to 117-N.

At the time of transmission to which data is input from a protocol upper layer, the data processing unit 112 generates a packet for wireless communication from the input data, performs processing such as addition of a header for media access control (MAC) or addition of an error detection code, and outputs processing data obtained as a result to the modulation/demodulation unit 113.

Furthermore, at the time of reception to which data from the modulation/demodulation unit 113 is input, the data processing unit 112 performs processing such as analysis of the MAC header, detection of a packet error, and reorder processing on the input data, and outputs processing data obtained as a result to the protocol upper layer.

At the time of transmission, the modulation/demodulation unit 113 performs processing such as encoding, interleaving, and modulation on the input data input from the data processing unit 112 on the basis of coding and modulation systems set by the control unit 101 and the like, and outputs a data symbol stream obtained as a result to the signal processing unit 114.

Furthermore, at the time of reception, the modulation/demodulation unit 113 performs processing opposite to that at the time of transmission, that is, processing such as demodulation, deinterleaving, and decoding on a data symbol stream input from the signal processing unit 114 on the basis of coding and demodulation systems set by the control unit 101 and the like, and outputs processing data obtained as a result to the wireless control unit 111 or the data processing unit 112.

At the time of transmission, the signal processing unit 114 performs processing such as signal processing used for spatial separation as necessary on the data symbol stream input from the modulation/demodulation unit 113, and outputs one or more transmission symbol streams obtained as a result to the wireless interface units 116-1 to 116-N.

Furthermore, at the time of reception, the signal processing unit 114 performs processing such as signal processing for spatial decomposition of the stream as necessary on a received symbol stream input from each of the wireless interface units 116-1 to 116-N, and outputs a data symbol stream obtained as a result to the modulation/demodulation unit 113.

The channel estimation unit 115 calculates complex channel gain information of a propagation path from a preamble portion and a training signal portion of an input signal from each of the wireless interface units 116-1 to 116-N. The complex channel gain information calculated by the channel estimation unit 115 is used for demodulation processing in the modulation/demodulation unit 113 and spatial processing in the signal processing unit 114 via the wireless control unit 111.

At the time of transmission, the wireless interface unit 116-1 converts the transmission symbol stream input from the signal processing unit 114 into an analog signal, performs processing such as filtering and up-conversion on a carrier frequency, and outputs (transmits) a transmission signal obtained as a result to the amplifier unit 117-1 or the antenna 118-1.

Furthermore, at the time of reception, the wireless interface unit 116-1 performs processing opposite to that at the time of transmission, that is, processing such as down-conversion on a reception signal input from the amplifier unit 117-1 or the antenna 118-1, and outputs a reception symbol stream obtained as a result to the signal processing unit 114.

At the time of transmission, the amplifier unit 117-1 amplifies the transmission signal (analog signal) input from the wireless interface unit 116-1 to predetermined power and transmits the amplified transmission signal to the antenna 118-1. Furthermore, at the time of reception, the amplifier unit 117-1 amplifies a reception signal (analog signal) input from the antenna 118-1 to predetermined power, and outputs the amplified reception signal to the wireless interface unit 116-1.

Note that the wireless interface units 116-2 to 116-N are configured in a manner similar to the wireless interface unit 116-1, the amplifier units 117-2 to 117-N are configured in a manner similar to the amplifier unit 117-1, and the antennas 118-2 to 118-N are configured in a manner similar to the antenna 118-1, and thus, description thereof is omitted here.

Furthermore, in the amplifier unit 117 (117-1 to 117-N), (at least a part of) at least one of the function at the time of transmission or the function at the time of reception may be included in the wireless interface unit 116 (116-1 to 116-N). Furthermore, in the amplifier unit 117 (117-1 to 117-N), (at least a part of) at least one of the function at the time of transmission or the function at the time of reception may be a component external to the communication unit 102.

Moreover, by using each component of the wireless interface units 116-1 to 116-N, the amplifier units 117-1 to 117-N, and the antennas 118-1 to 118-N as one set (for example, by using one or more wireless interface units 116, one or more amplifier units 117, and one or more antennas 118 as one set), one or more sets may be included as components.

The power supply unit 103 includes a battery power supply or a fixed power supply, and supplies power to each unit of the communication device 10.

In the communication device 10 configured as described above, in particular, the following processing is performed by the control unit 101 and the wireless control unit 111, for example.

First, in the communication device 10 (for example, the base station AP-a or the terminal STA-a1), the control unit 101 and the wireless control unit 111 perform control to transmit a second signal (test signal request signal) including a transmission request for a first signal (test signal signal) for measuring reception power or propagation loss to another communication device (for example, the base station AP-b), receive a first signal (test signal signal) transmitted from another communication device 10 (for example, the terminal STA-b1, STA-b2), measure the reception power or the propagation loss on the basis of the received first signal (test signal signal), and control transmission power on the basis of the measured reception power or propagation loss.

However, prior to the control of this transmission power, for example, the control unit 101 and the wireless control unit 111 of the base station AP-a control operation of each unit so as to exchange information regarding acceptable interference (acceptable interference information) and information regarding a threshold (threshold information) with the other base station AP-b and to notify the subordinate terminal STA-a1 of these pieces of information. On the other hand, the control unit 101 and the wireless control unit 111 of the terminal STA-a1 control operation of each unit so as to receive, from the connected base station AP-a, the information regarding the acceptable interference (acceptable interference information) and the information regarding the threshold (threshold information) of the other base station AP-b and to request the base station AP-a to transmit the first signal (test signal signal).

Then, the control unit 101 and the wireless control unit 111 of the base station AP-a or the terminal STA-a1 measure the reception power or the propagation loss on the basis of the first signal (test signal signal) from the terminal STA-b1, STA-b2, compare the measured reception power or propagation loss with reception power or propagation loss of desired communication, and control the transmission power on the basis of a comparison result thereof. At this time, the control unit 101 and the wireless control unit 111 may control the operation of each unit so as to perform operation regarding handover on the basis of the comparison result of the reception power or the propagation loss.

Secondly, in the communication device 10 (for example, the base station AP-b), the control unit 101 and the wireless control unit 111 perform control to receive a second signal (for example, a test signal request signal) transmitted from a third another communication device (for example, the base station AP-a or the terminal STA-a1) and including a transmission request for a first signal (for example, a test signal signal) for measuring reception power or propagation loss, and transmit a third signal (for example, a test signal trigger signal) including the transmission request for the first signal (for example, the test signal signal) to a first another communication device (for example, the terminal STA-b1, STA-b2) on the basis of the received second signal (for example, the test signal request signal).

Thirdly, in the communication device 10 (for example, the terminal STA-b1, STA-b2), the control unit 101 and the wireless control unit 111 perform control to receive a third signal (for example, a test signal trigger signal) transmitted from a second another communication device (for example, the base station AP-b) and including a transmission request for a first signal (for example, a test signal signal) for measuring reception power or propagation loss, and transmit the first signal (for example, the test signal signal) to a third another communication device (for example, the base station AP-a or the terminal STA-a1) on the basis of the received third signal (for example, the test signal trigger signal).

Hereinafter, a communication device (wireless communication device) to which the present technology is applied will be described in detail with reference to the drawings. However, the above-described control may be performed by at least one of the control unit 101 or the wireless control unit 111, and a case where the control is performed by the control unit 101 will be exemplified in the following description.

2. First Embodiment

Example of Sequence

Figure 3:
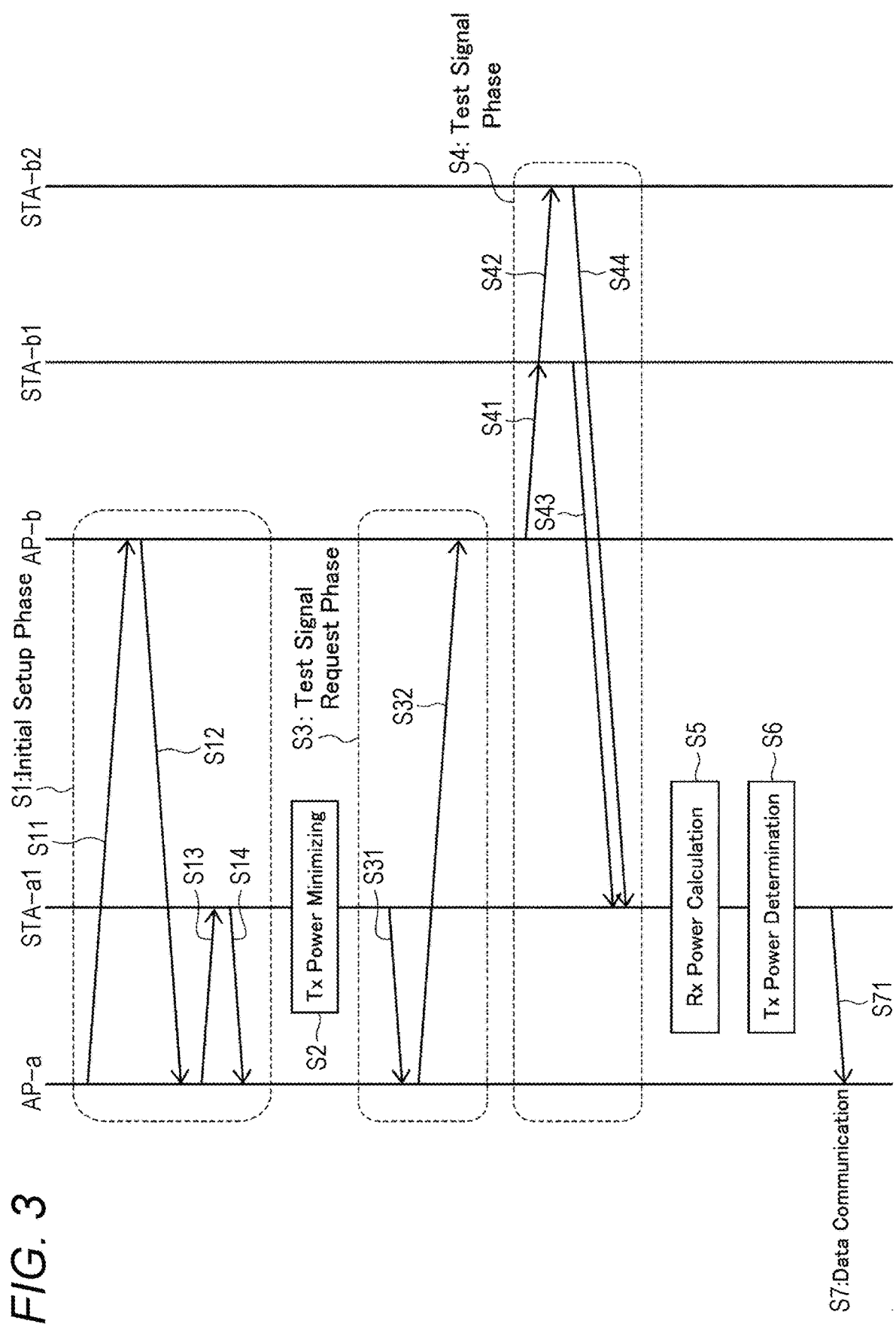
FIG. 3 is a diagram illustrating an example of a sequence in a first embodiment.

FIG. 3 illustrates an example of a sequence in a first embodiment.

The sequence of FIG. 3 illustrates operation of the base station AP-a and its subordinate terminal STA-a1, and the base station AP-b and its subordinate terminal STA-b1, STA-b2 in the configuration of the wireless communication system illustrated in FIG. 1.

Furthermore, transmission power can be controlled by either the base station AP-a or the terminal STA-a1, but the sequence of FIG. 3 particularly illustrates a case where the terminal STA-a1 controls the transmission power.

First, in each of the base station AP and the terminal STA, an initial setup phase is performed (S1).

In this initial setup phase, the base stations APs (AP-a, AP-b) or the base station AP (AP-a, AP-b) and the terminal STA (STA-a1, STA-b1, STA-b2) connected therewith mutually confirm whether they correspond to operation included in the sequence, that is, perform a capability check.

At the time of this capability check, the base station AP-a can transmit a confirmation signal including information regarding operation corresponding to the base station AP-a (for example, capability information) to the other base station AP-b, to the subordinate terminal STA-a1, or by broadcast. Furthermore, the other base station AP-b or the subordinate terminal STA-a1 that has received this confirmation signal may return a response signal including information regarding operation corresponding to the other base station AP-b or the subordinate terminal STA-a1 (for example, capability information).

Furthermore, in the initial setup phase, the base stations APs notify each other of information regarding interference accepted by its own base station AP and the subordinate terminal STA (hereinafter, referred to as acceptable interference information). This acceptable interference information includes, for example, at least one or more of information regarding acceptable interference power (hereinafter, referred to as interference power information), information regarding the number of terminals that receive acceptable interference (hereinafter, referred to as interfered terminal number information), or the like.

Note that, in the initial setup phase, the base stations APs may notify each other of information regarding a threshold (hereinafter, referred to as threshold information) used when transmission power control based on a reception result of a test signal signal is performed. Details of the test signal signal will be described later.

Furthermore, the base station AP-a may notify the subordinate terminal STA-a1 of information regarding an identifier of a network (BSS) (for example, network identifier information) configured by the other base station AP-b that has confirmed whether the base station AP-a corresponds to the operation and acceptable interference information and threshold information received from the other base station AP-b.

In the initial setup phase, the base station AP and the terminal STA connected therewith hold reception power of signals to be mutually transmitted and received or propagation loss calculated from the transmission power and the reception power of the signals to be mutually transmitted and received.

In FIG. 3, for example, the base station AP-a transmits a confirmation signal to the other base station AP-b (S11), and receives a response signal from the other base station AP-b (S12). Furthermore, the base station AP-a transmits a confirmation signal to the subordinate terminal STA-a1 (S13), and receives a response signal from the subordinate terminal STA-a1 (S14).

As described above, in the initial setup phase (S1), the above-described signals are exchanged between the communication devices 10, whereby acceptable interference information including interference power information and interfered terminal number information, information such as threshold information, and the like are shared.

After the initial setup phase is completed, the base station AP or the terminal STA minimizes the transmission power (S2). For example, in FIG. 3, the terminal STA-a1 minimizes the transmission power within a range that satisfies required signal noise (SN) of a modulation and coding system used for communication with the base station AP-a in a necessary and sufficient manner.

Note that the base station AP and the terminal STA may control their own signal detection threshold according to a control amount of the transmission power. Furthermore, the base station AP and the terminal STA may perform desired communication at this point.

Next, in each of the base station AP and the terminal STA, a test signal request phase is performed (S3).

In this test signal request phase, the base station AP (AP-a) transmits a test signal request signal to the other base station AP (AP-b). This test signal request signal is a signal for requesting transmission of a test signal signal. Details of the test signal signal will be described later.

Note that the test signal request signal may be transmitted to a plurality of base stations APs. Furthermore, the test signal request signal may be transmitted on the basis of a request from the subordinate terminal STA (STA-a1). Furthermore, the test signal request signal may be transmitted using normal transmission power that is not minimized.

The test signal request signal includes information regarding transmission power (hereinafter, referred to as transmission power information) used by each terminal STA (STA-b1, STA-b2) at the time of transmitting the test signal signal.

Furthermore, the test signal request signal includes information regarding an identifier of a group of terminals STAs (STA-b1, STA-b2) that transmits the test signal signal (hereinafter, referred to as group identifier information). This group identifier information may be an identifier of a network configured by the other base station AP (AP-b), and for example, BSS color information, BSSID information, SSID information, and the like defined by IEEE 802.11 can be used.

The test signal request signal includes information regarding a resource used by a group of terminals STAs (STA-b1, STA-b2) that transmits the test signal signal (hereinafter, referred to as group resource information). This group resource information may be information indicating a frequency channel. Furthermore, in a case where the test signal request signal is transmitted to the plurality of base stations APs, different resources can be allocated to every base station AP.

The test signal request signal may include information regarding a transmission timing (hereinafter, referred to as transmission timing information) of the test signal signal. The transmission timing information may include, for example, a relative time from transmission time of the test signal request signal or a relative time from a reference signal serving as a reference of the network, in addition to absolute time. Note that the reference signal may be a beacon frame defined by IEEE 802.11.

Here, in FIG. 3, for example, in a case where the subordinate terminal STA-a1 requests the base station AP-a to transmit the test signal request signal, the subordinate terminal STA-a1 transmits a signal including contents that are the same as or corresponding to those of the test signal request signal (S31). Then, for example, in a case where the base station AP-a receives the signal from the subordinate terminal STA-a1, the base station AP-a transmits a test signal request signal including contents that are the same as or corresponding to those of the received signal to the base station AP-b (S32).

As described above, in the test signal request phase (S3), the above-described signal is exchanged between the communication devices 10, so that the test signal request signal is transmitted from the base station AP to the other base station AP.

Next, in each of the base station AP and the terminal STA, a test signal phase is performed (S4).

In the test signal phase, the base station AP (AP-b) that has received the test signal request signal in the test signal request phase transmits a test signal trigger signal to the subordinate terminal STA (STA-b1, STA-b2).

The test signal trigger signal is transmitted by broadcast, to a multicast address including a plurality of subordinate terminals STAs, or an individual address of the subordinate terminal STA. The test signal trigger signal indicates that the signal is a signal that induces transmission of the test signal signal. Furthermore, the test signal signal may indicate that an orthogonal frequency division multiple access (OFDMA) system is used.

The test signal trigger signal includes transmission power information and group identifier information. The transmission power information and the group identifier information are the same as or correspond to the information included in the test signal request signal. This group identifier information may be an identifier of a network configured by the base station AP that transmits the test signal trigger signal, and for example, BSS color information, BSSID information, SSID information, and the like defined by IEEE 802.11 can be used.

The test signal trigger signal includes information regarding an identifier of the terminal STA that induces transmission of the test signal signal (hereinafter, referred to as terminal identification information) and information regarding a resource used by the terminal STA (hereinafter, referred to as terminal resource information).

The terminal identification information may be an identifier allocated when the terminal STA is connected, or may be an identifier unique to the terminal STA. Furthermore, the terminal identification information may be, for example, an association ID (AID) or a media access control (MAC) address defined by IEEE 802.11, or may be some information thereof.

The terminal identification information includes only an identifier of the terminal STA that can use the transmission power specified by the test signal trigger signal and of the terminal STA that can be controlled while maintaining constant accuracy with respect to the specified transmission power.

The terminal resource information may be information regarding a frequency resource (hereinafter, referred to as frequency resource information). This frequency resource information may be information indicating a part of a frequency band of a frequency channel, or may be information indicating a center frequency and a frequency width or information regarding an identifier of a resource capable of specifying the center frequency and the frequency width (hereinafter, referred to as resource identification information). As this resource identification information, for example, resource unit (RU) information defined by IEEE 802.11 can be used.

Note that the test signal trigger signal may include a plurality of pieces of terminal identification information and terminal resource information for the terminal STA to be induced. Furthermore, the test signal trigger signal may be transmitted at a timing when the test signal signal is transmitted on the basis of transmission timing information included in the test signal request signal.

Then, each terminal STA (STA-b1, STA-b2) that has received the test signal trigger signal from the base station AP (AP-b) transmits the test signal signal on the basis of the information included in the test signal trigger signal corresponding to the test signal request signal.

The test signal signal is transmitted as an OFDM signal. Here, the OFDM signal includes a portion transmitted using an entire band of the frequency channel and a portion transmitted using a part of the frequency band of the frequency channel specified by the test signal trigger signal.

Note that the OFDM signal may be transmitted using a format of a high efficiency trigger based physical layer convergence protocol (PLCP) protocol data unit (HE TB PPDU) defined by IEEE 802.11.

The test signal signal is transmitted using the transmission power specified by the test signal request signal. However, the terminal STA that cannot use the specified transmission power and the terminal STA that cannot be controlled while maintaining constant accuracy with respect to the specified transmission power are prevented from transmitting the test signal signal.

Furthermore, the test signal signal may be transmitted including information indicating that it is a test signal signal (hereinafter, referred to as signal information). This signal information may be stored in a physical header or a MAC header of the test signal signal, or may be stored in a MAC payload as a frame.

The test signal signal is transmitted including the group identifier information specified by the test signal request signal. This group identifier information may be stored in the physical header or the MAC header of the test signal signal, or may be stored in the MAC payload as the frame.

Note that the test signal signal may be transmitted by broadcast or to its own communication device (to a transmitter itself).

In FIG. 3, for example, the base station AP-b transmits the test signal trigger signal to the terminal STA-b1 and the terminal STA-b2 on the basis of the test signal request signal received from the base station AP-a (S41, S42). On the other hand, the terminal STA-b1 and the terminal STA-b2 each transmit the test signal signal on the basis of the test signal trigger signal received from the base station AP-b (S43, S44).

As described above, in the test signal phase (S4), the above-described signal is exchanged between the communication devices 10, so that the test signal signal from the subordinate terminal STA of the other base station AP is transmitted to the base station AP or the terminal STA.

Next, the base station AP or the terminal STA that has received the test signal signal measures (calculates) reception power of the test signal signal, and holds information regarding the measured reception power (hereinafter, referred to as reception power information) (S5).

At this time, the base station AP or the terminal STA may hold information regarding the identifier of the corresponding terminal STA or the identifier of the group to which the corresponding terminal STA belongs.

The measurement herein may be performed using power of the portion transmitted using the entire band of the frequency channel of the test signal signal, or may be performed using power of the portion transmitted using the part of the frequency band of the frequency channel thereof.

Furthermore, this measurement may be performed by applying correction so as to be converted into a prescribed frequency band. The base station AP or the terminal STA that has received the test signal signal holds the largest reception power or information regarding the smallest propagation loss calculated from the largest reception power and the transmission power specified by the test signal request signal (hereinafter, referred to as propagation loss information).

For example, in FIG. 3, the terminal STA-a1 holds reception power information or propagation loss information calculated from the test signal signal transmitted by the terminal STA-b1.

Note that in a case where the interfered terminal number information regarding the number of terminals receiving two or more acceptable interference is received in the initial setup phase, for example, a plurality of pieces of reception power information in descending order by the specified number or a plurality of pieces of propagation loss information in ascending order by the specified number are held.

Next, the base station AP or the terminal STA that has received the test signal signal determines transmission power used for communication (S6).

For example, in FIG. 3, the terminal STA-a1 determines transmission power used for communication on the basis of the reception power or the propagation loss between the base station AP-a and the connected terminal STA-a1 measured in the initial setup phase and the largest reception power or the smallest propagation loss measured after the test signal phase.

Here, an example in which the terminal STA-a1 determines the transmission power using propagation loss La-1 measured in the initial setup phase and smallest propagation loss Lb-1 measured after the test signal phase will be described.

For example, in a case where the propagation loss Lb-1 is larger than the propagation loss La-1, the terminal STA-a1 performs control to increase the transmission power subjected to the minimization (S2). Furthermore, for example, in a case where the threshold information is received in the initial setup phase, when a difference between the propagation loss Lb-1 and the propagation loss La-1 is larger than the threshold indicated by the threshold information, control to increase the transmission power is similarly performed.

This control is performed such that the transmission power becomes equal to or less than the acceptable interference power indicated by (the interference power information of) the acceptable interference information notification of which is provided in the initial setup phase by the propagation loss Lb-1.

Here, in the initial setup phase, in a case where the interfered terminal number information regarding the number of terminals that receive two or more acceptable interference is received as the acceptable interference information, calculation and control may be performed using the propagation loss corresponding to the specified number in order. For example, this is performed in a case where it is determined that communication characteristics are improved by a certain level or more by accepting interference to a specific terminal STA and propagation is performed.

On the other hand, in a case where the propagation loss Lb-1 is smaller than the propagation loss La-1, the terminal STA-a1 maintains the minimized transmission power.

Then, the base station AP or the terminal STA that has determined the transmission power used for communication transmits a signal using the determined transmission power (S71). Therefore, the base station AP-a and the terminal STA-a1 perform communication (S7).

Furthermore, a signal detection threshold may be controlled according to the transmission power used at this time. For example, the base station AP or the terminal STA can increase the signal detection threshold on the basis of a difference between the transmission power and a specified value used at this time.

As described above, in the present technology, it can be also said that by sequentially performing the initial setup phase (S1), the test signal request phase (S3), and the test signal phase (S4), the distance to the other network (BSS) is calculated after the transmission power is first minimized to a level at which communication with the communication device to be communicated is possible, and that it is determined to increase the transmission power in a case where a communication device connected to the other network (BSS) is located farther than the communication device to be communicated. Then, this transmission power is set to a value increased until interference with the communication device connected to the other network (BSS) reaches an acceptable amount.

In other words, by going through the step of minimizing the transmission power (S2), the transmission power can be set (S5, S6) adaptively (adaptive) in accordance with, for example, distribution of the terminals STAs and degree of surrounding congestion. In particular, in a non-congested environment, the transmission power can be maximized, and as a result, a SINR can be maximized.

Note that, in the sequence of FIG. 3, a case where the terminal STA-a1 controls the transmission power in the base station AP and the terminal STA constituting the wireless communication system has been exemplified, but the same applies to, for example, a case where the base station AP-a controls the transmission power.

Next, a flow of communication processing performed in each of the base station AP and the terminal STA constituting the wireless communication system will be described with reference to flowcharts of FIGS. 4 to 7.

Communication Processing of Base Station AP-a

Figure 4:
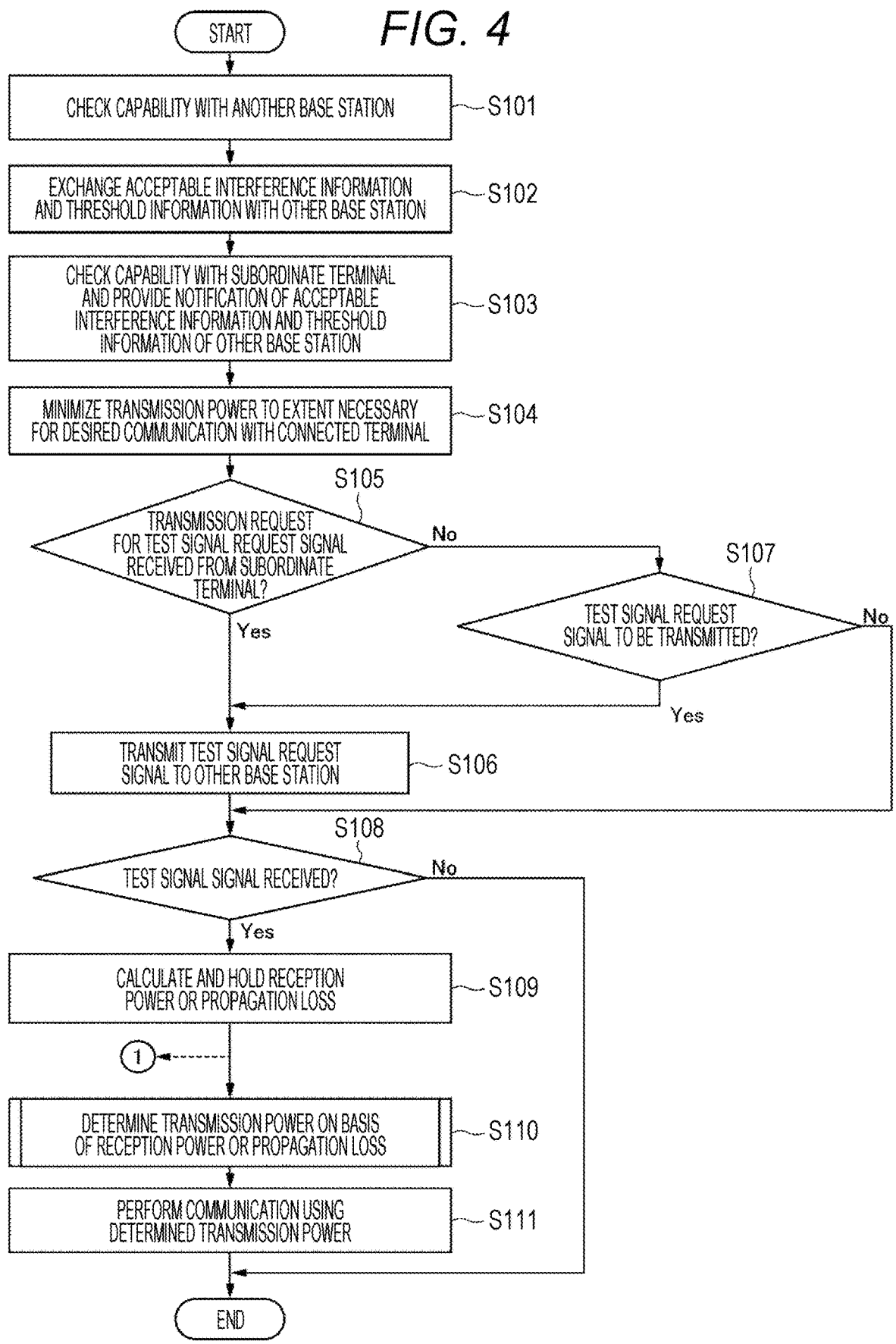
FIG. 4 is a flowchart illustrating a flow of communication processing executed by a base station AP-a.

First, a flow of communication processing executed by (the control unit 101 of) the base station AP-a in the sequence of FIG. 3 will be described with reference to the flowchart of FIG. 4. However, FIG. 4 illustrates a case where the base station AP-a controls transmission power.

In the base station AP-a, processing of steps S101 to S103 is executed in the initial setup phase.

Specifically, the control unit 101 checks capability with the other base station AP-b (S101) and exchanges acceptable interference information and threshold information therewith (S102). Furthermore, the control unit 101 checks capability with the subordinate terminal STA-a1 and notifies it of the acceptable interference information and the threshold information of the other base station AP-b (S103).

When the initial setup phase is completed, processing of step S104 is executed in the base station AP-a. Specifically, the control unit 101 minimizes transmission power to the extent necessary for desired communication with the connected terminal STA-a1 (S104).

Subsequently, in the base station AP-a, processing of steps S105 to S107 is executed in the test signal request phase.

Specifically, the control unit 101 determines whether a transmission request for a test signal request signal has been received from the subordinate terminal STA-a1 (S105).

In a case where it is determined in the determination processing of step S105 that the transmission request for the test signal request signal has been received, the control unit 101 transmits the test signal request signal to the other base station AP-b (S106).

On the other hand, in a case where it is determined in the determination processing of step S105 that the transmission request for the test signal request signal has not been received, the control unit 101 determines whether to transmit the test signal request signal (S107).

In a case where it is determined in the determination processing of step S107 that the test signal request signal is to be transmitted, the control unit 101 transmits the test signal request signal to the other base station AP-b (S106).

In a case where the processing of step S106 ends or it is determined in the determination processing of step S107 that the test signal request signal is not to be transmitted, the test signal request phase is completed.

Subsequently, in the base station AP-a, processing of step S108 is executed in the test signal phase.

Specifically, the control unit 101 determines whether a test signal signal has been received from the subordinate terminal STA-b1, STA-b2 of the other base station AP-b (S108).

Then, in a case where it is determined in the determination processing of step S108 that the test signal signal has been received, the test signal phase is completed, and processing of steps S109 to S111 is executed.

Specifically, the control unit 101 calculates reception power or propagation loss on the basis of the received test signal signal, and holds the reception power or the propagation loss as reception power information or propagation loss information (S109). Furthermore, the control unit 101 determines transmission power on the basis of the held reception power information or propagation loss information (S110). Then, the control unit 101 performs communication with the terminal STA-a1 using the determined transmission power (S111). Note that details of this transmission power control will be described later with reference to a flowchart of FIG. 7.

In a case where the processing of step S111 ends, or in a case where it is determined in the determination processing of step S108 that the test signal signal has not been received and the processing of steps S109 to S111 is skipped, the communication processing of FIG. 4 ends.

Communication Processing of Base Station AP-b

Next, a flow of communication processing executed by (the control unit 101 of) the base station AP-b in the sequence of FIG. 3 will be described with reference to the flowchart of FIG. 5.

In the base station AP-b, processing of steps S121 to S123 is executed in the initial setup phase.

Specifically, the control unit 101 checks capability with the other base station AP-a (S121) and exchanges acceptable interference information and threshold information therewith (S122). Furthermore, the control unit 101 checks capability with the subordinate terminal STA-b1, STA-b2 and notifies it of the acceptable interference information and the threshold information of the other base station AP-a (S123).

Subsequently, in the base station AP-b, processing of step S124 is executed in the test signal request phase.

Specifically, the control unit 101 determines whether a test signal request signal has been received from the other base station AP-a (S124).

Then, in a case where it is determined in the determination processing of step S124 that the test signal request signal has been received, the test signal request phase is completed, and subsequently, processing of step S125 is executed in the test signal phase.

Specifically, the control unit 101 transmits a test signal trigger signal to the subordinate terminal STA-b1, STA-b2 (S125).

Figure 5:
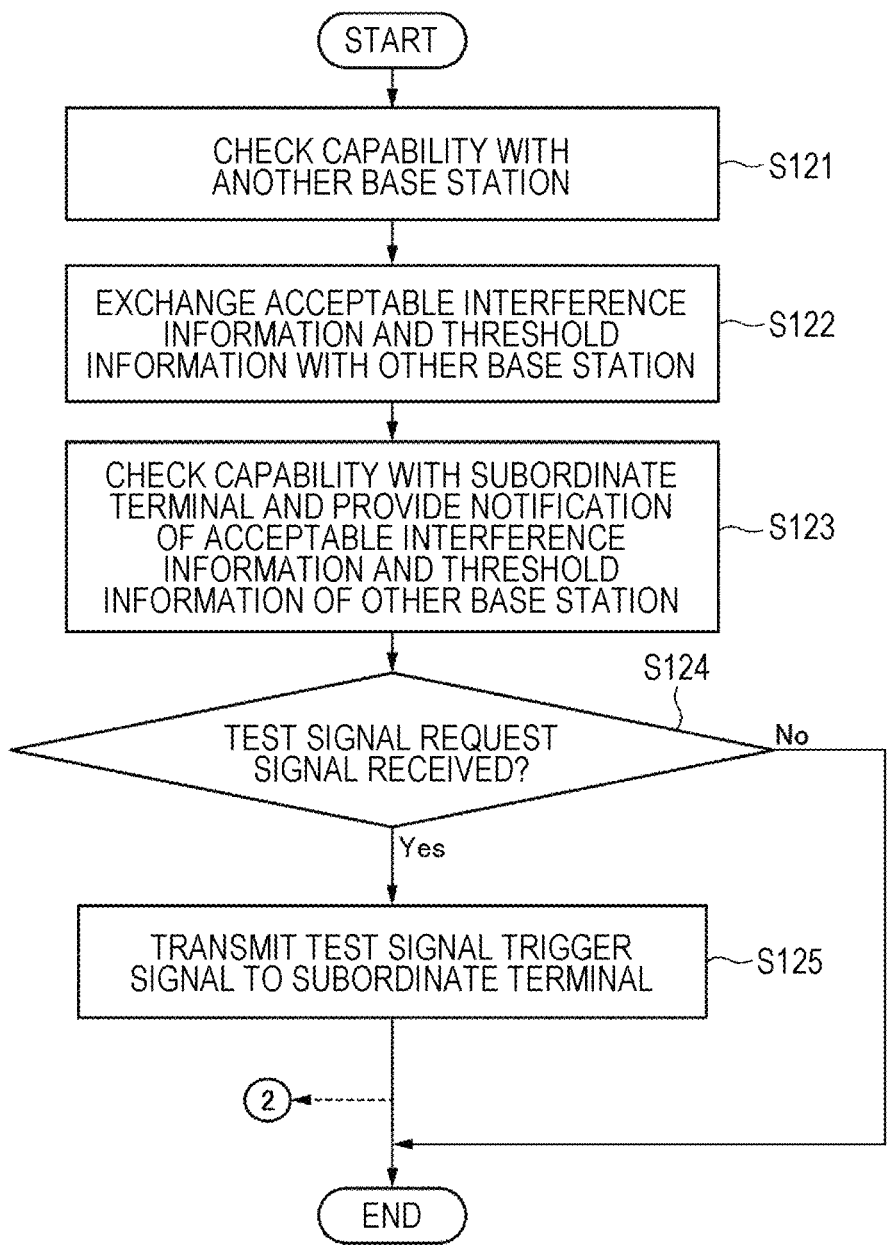
FIG. 5 is a flowchart illustrating a flow of communication processing executed by a base station AP-b.

In a case where the processing of step S125 ends, or in a case where it is determined in the determination processing of step S124 that the test signal request signal has not been received and the processing of step S125 is skipped, the communication processing of FIG. 5 ends.

Operation of Terminal STA

Figure 6:
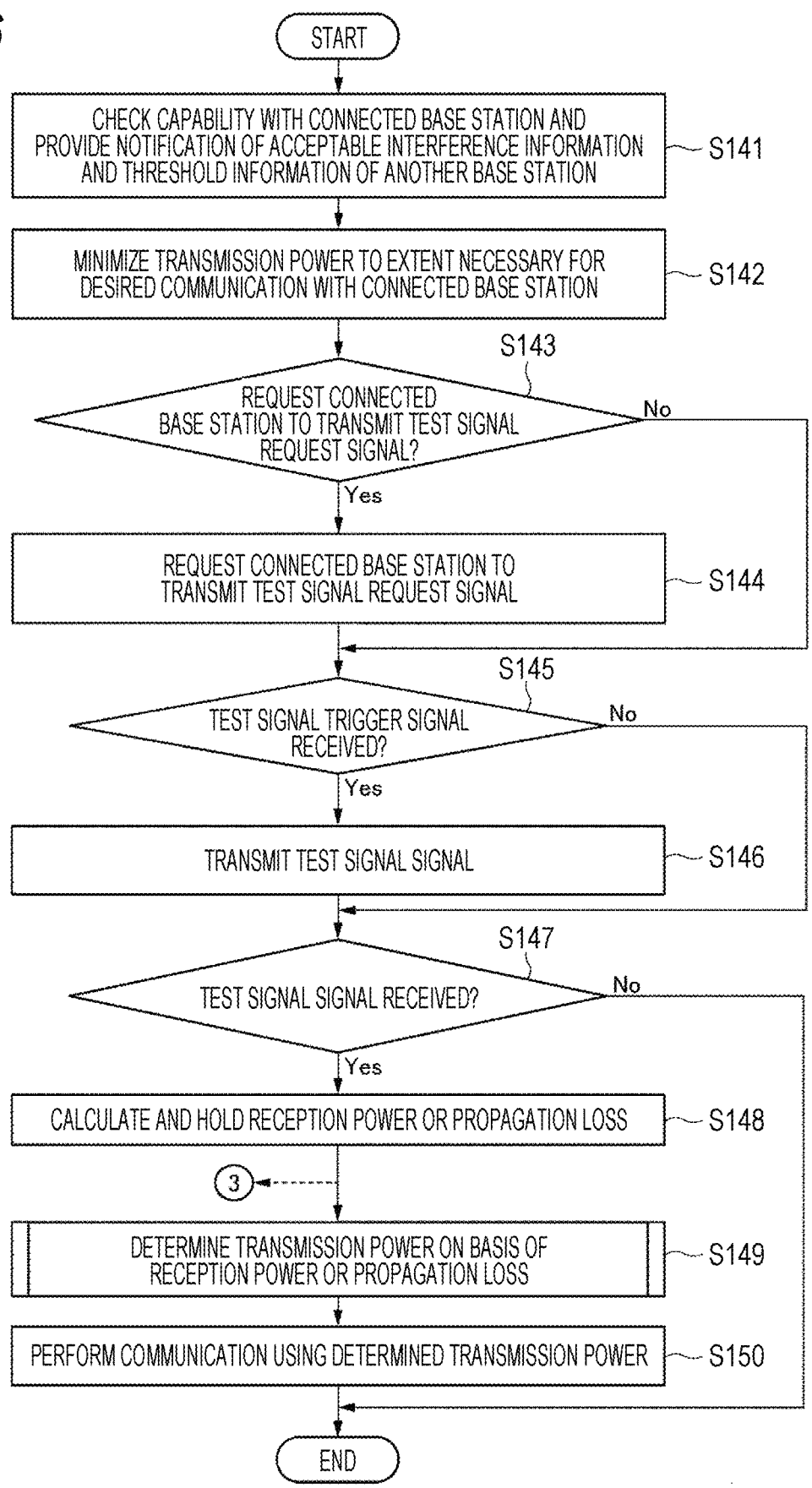
FIG. 6 is a flowchart illustrating a flow of communication processing executed by a terminal STA.

Next, a flow of communication processing executed by the terminal STA (control unit 101 of STA-a1, STA-b1, STA-b2) in the sequence of FIG. 3 will be described with reference to the flowchart of FIG. 6. However, FIG. 6 illustrates a case where the terminal STA-a1 controls transmission power.

In the terminal STA, processing of step S141 is executed in the initial setup phase.

Specifically, the control unit 101 of the terminal STA-a1 checks capability with the base station AP-a and receives notification of acceptable interference information and threshold information of the other base station AP-b (S141).

When the initial setup phase is completed, processing of step S142 is executed in the terminal STA. Specifically, the control unit 101 of the terminal STA-a1 minimizes transmission power to the extent necessary for desired communication with the connected base station AP-a (S142).

Subsequently, in the terminal STA, processing in steps S143 to S144 is executed in the test signal request phase.

Specifically, the control unit 101 of the terminal STA-a1 determines whether to request the connected base station AP-a to transmit a test signal request signal (S143).

In a case where it is determined in the determination processing of step S143 that the transmission of the test signal request signal is to be requested, the control unit 101 of the terminal STA-a1 requests the connected base station AP-a to transmit the test signal request signal (S144).

In a case where the processing of step S144 ends or it is determined in the determination processing of step S143 that the transmission of the test signal request signal is not to be requested, the test signal request phase is completed.

Subsequently, in the terminal STA, processing in steps S145 to S147 is executed in the test signal phase.

Specifically, the control unit 101 of the terminal STA-b1, the terminal STA-b2 determines whether a test signal trigger signal has been received from the connected base station AP-b (S145).

In a case where it is determined in the determination processing of step S145 that the test signal trigger signal has been received, the control unit 101 of the terminal STA-b1, the terminal STA-b2 transmits a test signal signal to the terminal STA-a1 (S146).

In a case where the processing of step S146 ends, or in a case where it is determined in the determination processing of step S145 that the test signal trigger signal has not been received and the processing of step S146 is skipped, the processing proceeds to step S147.

The control unit 101 of the terminal STA-a1 determines whether the test signal signal has been received from the subordinate terminal STA-b1, STA-b2 of the other base station AP-b (S147).

Then, in a case where it is determined in the determination processing of step S147 that the test signal signal has been received, the test signal phase is completed, and processing of steps S148 to S150 is executed.

Specifically, the control unit 101 of the terminal STA-a1 calculates reception power or propagation loss on the basis of the received test signal signal, and holds the reception power or the propagation loss as reception power information or propagation loss information (S148). Furthermore, the control unit 101 of the terminal STA-a1 determines transmission power on the basis of the held reception power information or propagation loss information (S149). Then, the control unit 101 of the terminal STA-a1 performs communication with the base station AP-a using the determined transmission power (S150). Note that details of this transmission power control will be described later with reference to the flowchart of FIG. 7.

In a case where the processing of step S150 ends, or in a case where it is determined in the determination processing of step S147 that the test signal signal has not been received and steps S148 to S150 are skipped, the communication processing of FIG. 6 ends.

Transmission Power Control Processing

Figure 7:
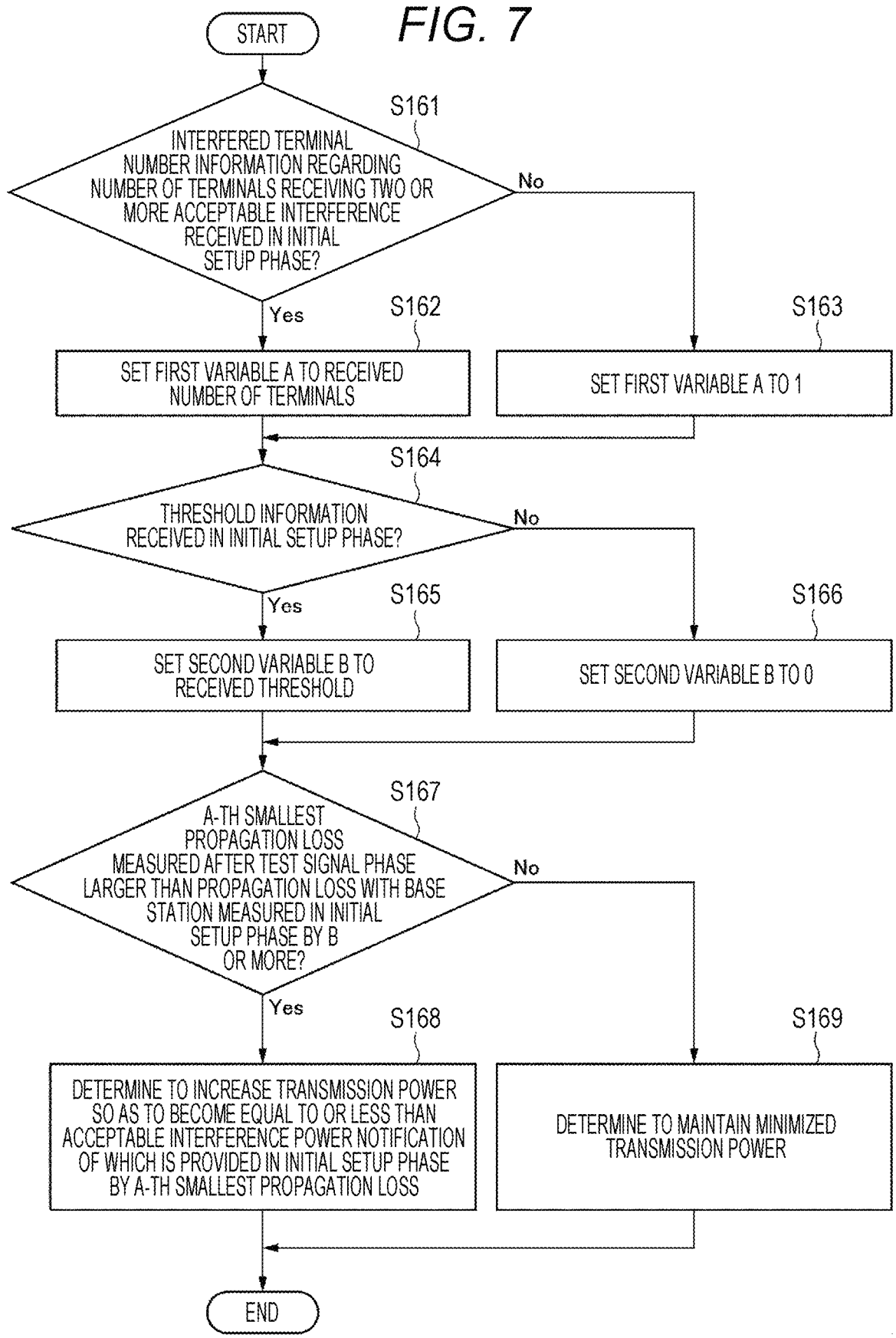
FIG. 7 is a flowchart illustrating a flow of transmission power control processing.

Next, a flow of transmission power control processing corresponding to step S110 of FIG. 4 or step S149 of FIG. 6 described above will be described with reference to the flowchart of FIG. 7. This transmission power control processing is executed by the control unit 101 of the base station AP-a or the terminal STA-a1.

In step S161, the control unit 101 determines whether interfered terminal number information regarding the number of terminals receiving two or more acceptable interference has been received in the initial setup phase.

In a case where it is determined in the determination processing of step S161 that the interfered terminal number information has been received, the control unit 101 sets a first variable A to the number of terminals indicated by the received interfered terminal number information (S162).

On the other hand, in a case where it is determined in the determination processing of step S161 that the interfered terminal number information has not been received, the control unit 101 sets the first variable A to 1 (S163).

When a value of the first variable A is set in the processing of step S162 or S163, the processing proceeds to step S164.

In step S164, the control unit 101 determines whether threshold information has been received in the initial setup phase.

In a case where it is determined in the determination processing of step S164 that the threshold information has been received, the control unit 101 sets a second variable B to a threshold indicated by the received threshold information (S165).

On the other hand, in a case where it is determined in the determination processing of step S164 that the threshold information has not been received, the control unit 101 sets the second variable B to 0 (S166).

When a value of the second variable B is set in the processing of step S165 or S166, the processing proceeds to step S167.

In step S167, the control unit 101 determines whether the A-th smallest propagation loss measured after the test signal phase is larger than the propagation loss with the base station AP measured in the initial setup phase by B or more.

In a case where a determination condition is satisfied and it is determined as affirmative ("Yes") in the determination processing of step S167, the processing proceeds to step S168. In this case, the control unit 101 determines to increase the transmission power so as to become equal to or less than the acceptable interference power indicated by (the interference power information of) the acceptable interference information notification of which is provided in the initial setup phase by the A-th smallest propagation loss.

On the other hand, in a case where the determination condition is not satisfied and it is determined as negative ("No") in the determination processing of step S167, the processing proceeds to step S169. In this case, the control unit 101 determines to maintain the transmission power minimized in the processing of step S104 of FIG. 4 or step S142 of FIG. 6.

When it is determined in the processing of step S168 or S169 that the transmission power is increased or maintained, the processing returns to step S110 of FIG. 4 or step S149 of FIG. 6, and the processing of step S110 or step S149 and a subsequent step is executed.

The flow of the communication processing executed by each of the base station AP and the terminal STA in the sequence of FIG. 3 has been described above.

Next, an example of a format of a signal transmitted and received between the base station AP and the terminal STA constituting the wireless communication system will be described with reference to FIGS. 8 to 11.

Configuration Example of Signal for ISF

FIG. 8 illustrates an example of a format of a signal for an initial setup phase.

In FIG. 8, the signal for the initial setup phase includes Coordinated Measurement & TPC Capability, Acceptable Interference, Acceptable Interfered STA Num., and Threshold for TPC.

Coordinated Measurement & TPC Capability includes capability information regarding a capability check. Note that Coordinated Measurement & TPC Capability is not limited to the format illustrated in FIG. 8, and may be stored in, for example, a beacon frame defined by IEEE 802.11.

Acceptable Interference includes interference power information about acceptable interference power. Acceptable Interfered STA Num. includes interfered terminal number information regarding the number of terminals that receive acceptable interference. Note that the interference power information and the interfered terminal number information are examples of acceptable interference information.

Threshold for TPC includes threshold information regarding a threshold used when transmission power control is performed. Furthermore, Available Transmission Power including information regarding transmission power capability of the base station AP and the subordinate terminal STA (hereinafter, referred to as transmission power capability information) may be included.

Note that the transmission power capability information may be information regarding maximum transmission power that can be transmitted. Furthermore, the transmission power capability information may include information regarding control accuracy of transmission power. Moreover, the transmission power capability information may include a plurality of values associated with a frequency bandwidth and the number of spatial streams.

Figure 10:
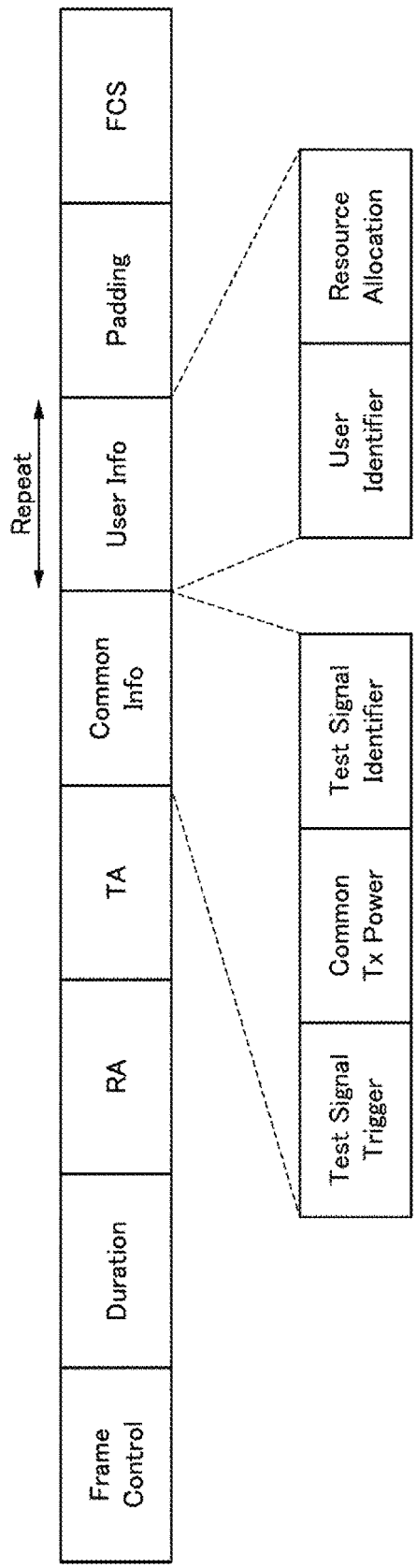
FIG. 10 is a diagram illustrating an example of a format of a test signal trigger signal.

Furthermore, information regarding the available transmission power including Available Tx Power can be exchanged as a configuration of the signal for the initial setup phase, so that the information may be used for transmission power information specified in Common Tx Power of a test signal trigger signal (FIG. 10).

Configuration Example of TSR Signal

FIG. 9 illustrates an example of a format of a test signal request signal.

In FIG. 9, the test signal request signal includes Common Tx Power, Test Signal Identifier, Coarse Resource Allocation, and Test Signal Timing.

Common Tx Power includes transmission power information regarding transmission power used by each terminal STA when a test signal signal is transmitted. The transmission power information may be determined on the basis of the transmission power capability information received in the initial setup phase.

Test Signal Identifier includes group identifier information regarding an identifier of a group of terminals STAs that transmits the test signal signal. Coarse Resource Allocation includes group resource information regarding a resource used by a group of terminals STAs that transmits the test signal signal (for example, information indicating a frequency channel). Test Signal Timing includes transmission timing information regarding a transmission timing of the test signal signal.

Note that, in FIG. 9, in a case where transmission of the test signal signal is requested to a plurality of base stations APs, Test Signal Identifier and Coarse Resource Allocation are repeated for the number of base stations APs.

Configuration Example of TST Signal

FIG. 10 illustrates an example of a format of a test signal trigger signal.

In FIG. 10, the test signal trigger signal is configured as a frame including Frame Control, Duration, RA, TA, Common Info, User Info, Padding, and FCS.

Frame Control includes information regarding a type of the frame. Duration includes information regarding length of the frame. A receiver address (RA) includes information regarding a transmission destination address of the frame. A transmitter address (TA) includes information regarding a transmission source address of the frame.

Common Info includes Test Signal Trigger, Common Tx Power, and Test Signal Identifier.

Test Signal Trigger includes information indicating that the frame is a signal that induces a test signal signal. Common Tx Power includes transmission power information regarding transmission power commonly used by each terminal STA when the test signal signal is transmitted. Test Signal Identifier includes group identifier information regarding an identifier of a group of terminals STAs that transmits the test signal signal.

User Info includes User Identifier and Resource Allocation.

User Identifier includes terminal identification information regarding an identifier of the terminal STA that induces transmission of the test signal signal. Resource Allocation includes terminal resource information regarding a resource used by the terminal STA that induces transmission of the test signal signal. Note that the terminal resource information may be frequency resource information or resource identification information.

Furthermore, User Info is repeated for the number of terminals STAs that induces transmission of the test signal signal ("Repeat" in the drawing).

Padding includes a bit for adjusting the length of the frame. A frame check sequence (FCS) includes information regarding error detection.

Configuration Example of TS Signal

Figure 11:
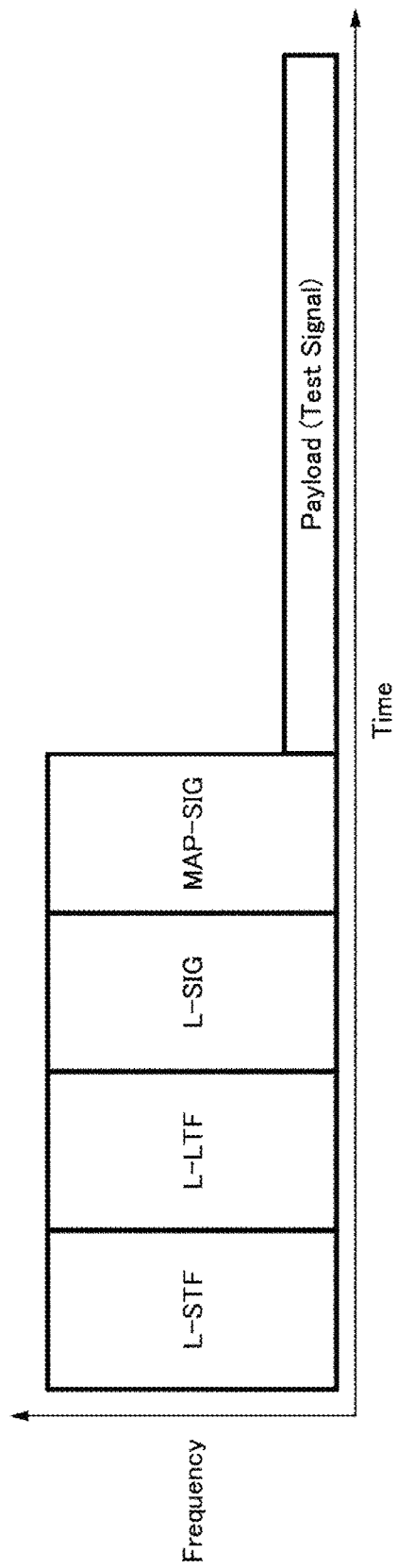
FIG. 11 is a diagram illustrating an example of a format of a test signal signal.

FIG. 11 illustrates an example of a format of a test signal signal. In FIG. 11, a vertical direction represents frequency, and a horizontal direction represents time.

In FIG. 11, the test signal signal includes a physical header at the head. The physical header may include a legacy short training field (L-STF), a legacy long training field (L-LTF), and a legacy signal field (L-SIG).

In the example of the format illustrated in FIG. 11, an area (MAP-SIG) for storing information regarding operation of propagation loss measurement by the plurality of base stations APs and transmission power control based on the measurement (hereinafter, referred to as transmission power control information) is included after the L-SIG. This transmission power control information may include signal information indicating that the test signal signal is stored and group identifier information regarding an identifier of a group of terminals STAs that transmits the test signal signal.

Here, in the example of the format illustrated in FIG. 11, an entire band of a frequency channel is used from the head to the MAP-SIG as represented by the frequency in the vertical direction in the drawing. Furthermore, in the example of the format illustrated in FIG. 11, a payload (Payload) including a test signal signal is included after the MAP-SIG. This payload uses a part of a frequency band of the frequency channel as represented by the frequency in the vertical direction in the drawing.

In other words, a format of a signal used in the OFDMA system is used as the payload. Furthermore, the test signal signal included in this payload may include a known signal sequence that does not include information.

Note that, in FIG. 11, the frequency channel used at the time of transmitting the head to the MAP-SIG can be specified by Coarse Resource Allocation (group resource information) of the test signal request signal, and a frequency band (a part of the frequency band of the frequency channel) used at the time of transmitting the payload subsequent to the MAP-SIG can be specified by Resource Allocation (terminal resource information) of User Info of the test signal trigger signal. Therefore, the test signal signal can be transmitted using the frequency band specified by the terminal resource information according to the OFDMA system for every terminal STA induced to transmit the test signal signal.

As described above, in the wireless communication system to which the present technology is applied, it is possible to minimize interference given to the terminal STA of the other network BSS in a necessary and sufficient manner. Therefore, it is possible to increase a throughput of communication in the other network BSS by increasing a transmission opportunity of the terminal STA of the other network BSS and increasing a signal interference noise ratio (SINR) thereof.

Furthermore, in the wireless communication system to which the present technology is applied, an increase in transmission power in desired communication is realized while suppressing interference given to the terminal STA of the other network BSS. Therefore, it is possible to increase a throughput of the desired communication by increasing a SINR in the desired communication.

Moreover, in the wireless communication system to which the present technology is applied, the throughput of communication in the other network BSS and the throughput of the desired communication are improved, so that a throughput of the entire system is increased. Furthermore, in the wireless communication system to which the present technology is applied, the transmission power is increased on the basis of the propagation loss with the terminal STA of the other network BSS after the transmission power is minimized, thereby making it possible to optimally set the transmission power in accordance with terminal distribution and congestion degree.

Furthermore, in the wireless communication system to which the present technology is applied, it is possible to maximize the transmission power, maximize a SINR, and maximize a throughput in a non-dense environment in which terminals of other networks do not exist in the surroundings. Furthermore, by using the method of controlling the transmission power only on the basis of magnitude of the propagation loss, it is possible to use an OFDMA system that does not require identification of the terminal STA at the time of measuring the propagation loss and can simultaneously perform the propagation loss with a large number of terminals STAs.

Particularly, in recent years, with the spread of wireless LAN systems, mutual interference between networks occurs due to densification of wireless LAN mounted devices. Moreover, in addition to a general base station (AP), a mesh-type device including a plurality of base stations (APs), a device having an access point function (for example, an AV device, a smartphone, and the like), etc. have spread. As distances between base stations (APs) and between networks (BSSs) including the base stations (APs) become shorter, it is assumed that densification and mutual interference become more serious. However, application of the present technology can cope with this.

Note that the configuration of the wireless communication system illustrated in FIG. 1 is an example, and the number and arrangement of base stations APs, terminals STAs, and networks BSSs are not limited thereto.

For example, in the wireless communication system illustrated in FIG. 1, a case where the plurality of base stations APs transmits and receives signals to and from each other, but another base station AP that controls the plurality of base stations APs may exist. A configuration of such a wireless communication system is illustrated in FIG. 12.

Figure 12:
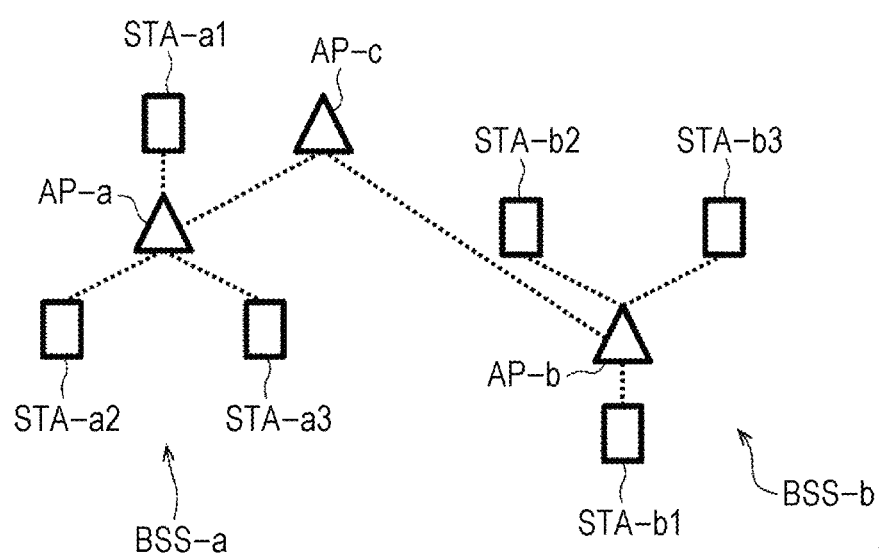
FIG. 12 is a diagram illustrating a second example of a configuration of a wireless communication system to which the present technology is applied.

In FIG. 12, the base station AP-a and the terminals STA-a1 to STA-a3 constitute the network BSS-a, and the base station AP-b and the terminals STA-b1 to STA-b3 constitute the network BSS-b. Furthermore, a base station AP-c that controls the base station AP-a and the base station AP-b is provided in FIG. 12.

In a case where such a configuration is adopted, a signal transmitted and received between the base station AP-a and the base station AP-b is transmitted and received via the base station AP-c. Here, the signal to be transmitted and received includes, for example, signals such as the signal transmitted in the initial setup phase (signal for ISF in FIG. 8), the test signal request signal transmitted in the test signal request phase (TSR signal in FIG. 9), and the like.

3. Second Embodiment

Example of Sequence

Figure 13:
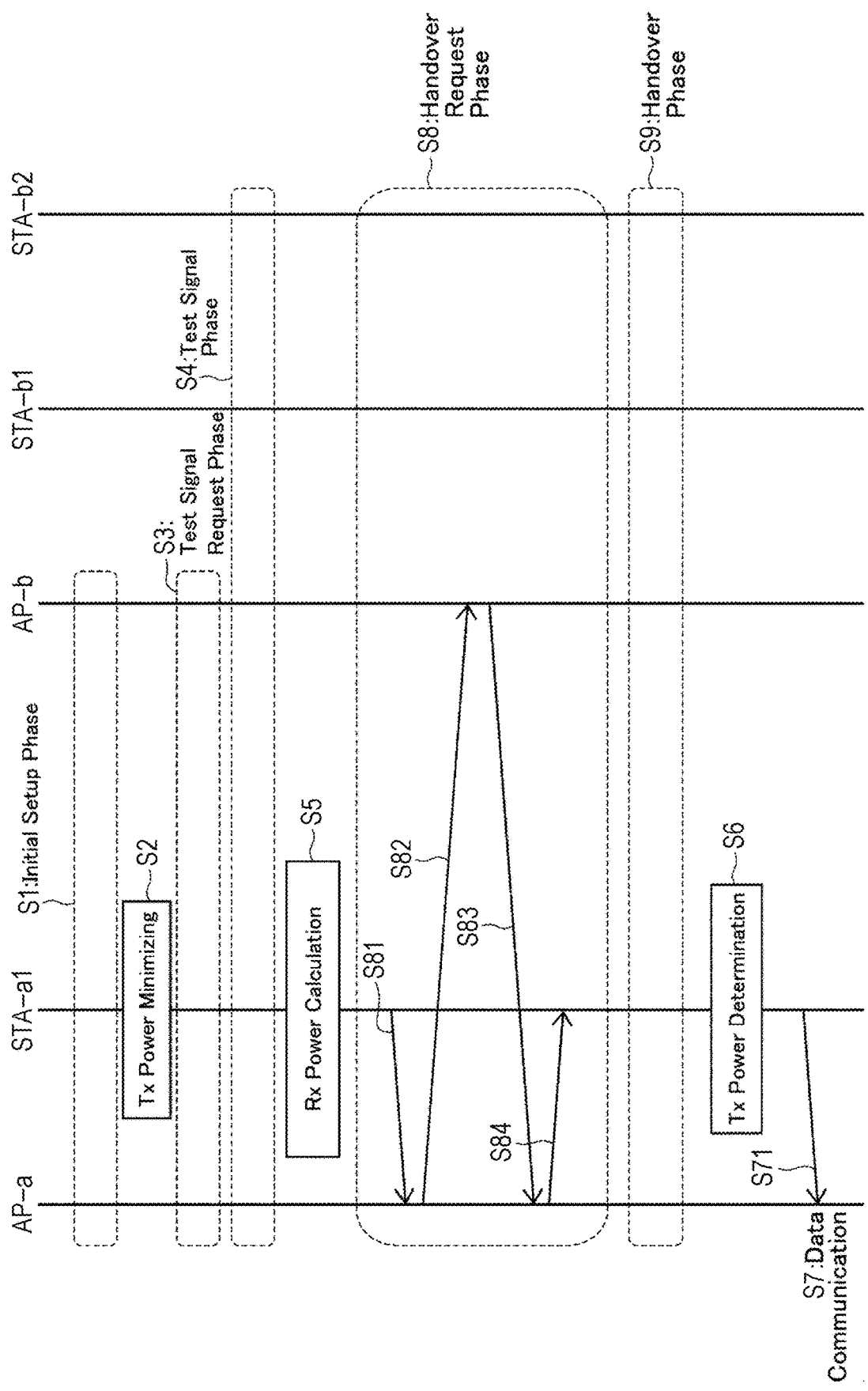
FIG. 13 is a diagram illustrating an example of a sequence in the second embodiment.

FIG. 13 illustrates an example of a sequence in a second embodiment.

The sequence of FIG. 13 illustrates operation of the base station AP-a and its subordinate terminal STA-a1, and the base station AP-b and its subordinate terminal STA-b1, STA-b2 in the configuration of the wireless communication system illustrated in FIG. 1.

In particular, the sequence of FIG. 13 illustrates an example in which a base station AP or a terminal STA of a certain network performs processing according to a terminal STA of another network that is close to the base station AP or the terminal STA. For example, in a case where the terminal STA-b1 of the network BSS-b is close to the other network BSS-a, processing performed by the base station AP-a or the terminal STA-a1 is assumed.

Furthermore, also here, transmission power can be controlled by either the base station AP-a or the terminal STA-a1, and particularly, a case where the terminal STA-a1 controls the transmission power is illustrated.

In the sequence of FIG. 13, the initial setup phase (S1), minimization of the transmission power (S2), and the test signal request phase (S3) are similar to those in the sequence of FIG. 3 described above, and thus description thereof will be omitted.

Here, in the sequence of FIG. 13, the test signal phase (S4) and the format of the signal are similar to those in the sequence of FIG. 3 described above except for the following points.

In other words, in the test signal phase of FIG. 13, the test signal signal can include information regarding an identifier of the terminal STA (STA-b1, STA-b2) that performs transmission (hereinafter, referred to as terminal identifier information).

As this terminal identifier information, for example, an association ID (AID), a media access control (MAC) address, and the like defined by IEEE 802.11 can be used. The terminal identifier information can be stored in, for example, a MAC header. Furthermore, in a case of using a format of a signal used in the OFDMA system, which is configured using a part of a frequency band of a frequency channel of the format used by the test signal signal, the terminal identifier information may be stored in a payload configured using the format of the signal.

The base station AP or the terminal STA that has received the test signal signal measures reception power of the test signal signal (S5).

This measurement is performed in a similar manner to the sequence of FIG. 3 described above. Furthermore, for example, the terminal STA-a1 holds reception power information and propagation loss information after the measurement. Here, the reception power information and the propagation loss information to be held are held together with the identifier of the terminal STA (STA-b1, STA-b2) that has transmitted the corresponding test signal signal using the terminal identifier information.

Furthermore, the base station AP or the terminal STA that has received the test signal signal determines transmission power used for communication (S6).

In this determination, in a case where it is determined that communication characteristics are improved by a certain level or more by connecting (handing over) the terminal STA-b1 of the other network BSS-b corresponding to the held reception power information and propagation loss information to its own network BSS-a, a handover request phase (S8) regarding the terminal STA-b1 of the other network BSS-b is started.

In this handover request phase, for example, the base station AP-a transmits a handover request signal to the base station AP-b (S82). Note that this handover request signal may be transmitted in response to a request from the subordinate terminal STA-a1 (S81). The handover request signal includes information regarding an identifier of the terminal STA-b1 to be handed over (hereinafter, referred to as handover terminal identifier information).

Then, the base station AP-b that has received the handover request signal determines whether to perform handover of the terminal STA-b1 indicated by the handover terminal identifier information included in the handover request signal.

Thereafter, the base station AP-b transmits a handover answer signal including a determination result as to whether to perform the handover (hereinafter, referred to as a handover determination result) to the base station AP-a (S83). Note that the base station AP-a that has received the handover answer signal may notify the subordinate terminal STA-a1 of the handover determination result of the terminal STA-b1 (S84).

Here, in a case where it is determined that the handover is not performed, the base station AP or the terminal STA determines transmission power used for communication similarly to the sequence of FIG. 3 described above (S6).

On the other hand, in a case where it is determined that the handover is performed, a handover phase (S9) is started. In this handover phase, operation of changing a connection destination of the terminal STA-b1 from the base station AP-b to the base station AP-a is performed on the basis of a specified method.

Then, after the handover phase is completed, the base station AP or the terminal STA refers to the reception power information or the propagation loss information corresponding to the handed over terminal STA-b1, and determines the transmission power to be used for communication, similarly to the sequence of FIG. 3 described above (S6). Therefore, the base station AP-a and the terminal STA-a1 perform communication (S7).

Note that, also in the sequence of FIG. 13, a case where the terminal STA-a1 controls the transmission power in the base station AP and the terminal STA constituting the wireless communication system has been exemplified, but the same applies to, for example, a case where the base station AP-a controls the transmission power.

Next, a flow of communication processing performed in each of the base station AP and the terminal STA constituting the wireless communication system will be described with reference to flowcharts of FIGS. 14 to 16.

Communication Processing of Base Station AP-a

Next, a flow of communication processing executed by (the control unit 101 of) the base station AP-a in the sequence of FIG. 13 will be described with reference to the flowchart of FIG. 14. However, FIG. 14 illustrates a case where the base station AP-a controls transmission power.

Note that, when the communication processing of the base station AP-a in the sequence of FIG. 13 is compared with the communication processing of the base station AP-a in the sequence of FIG. 3, the processing from step S101 to step S109 is the same and the subsequent processing is different in the processing illustrated in the flowchart of FIG. 4. That is, here, FIG. 4 and FIG. 14 are associated with each other by a number "1", and the flowchart of FIG. 14 illustrates processing executed subsequent to steps S101 to S109 of FIG. 4.

Figure 14:
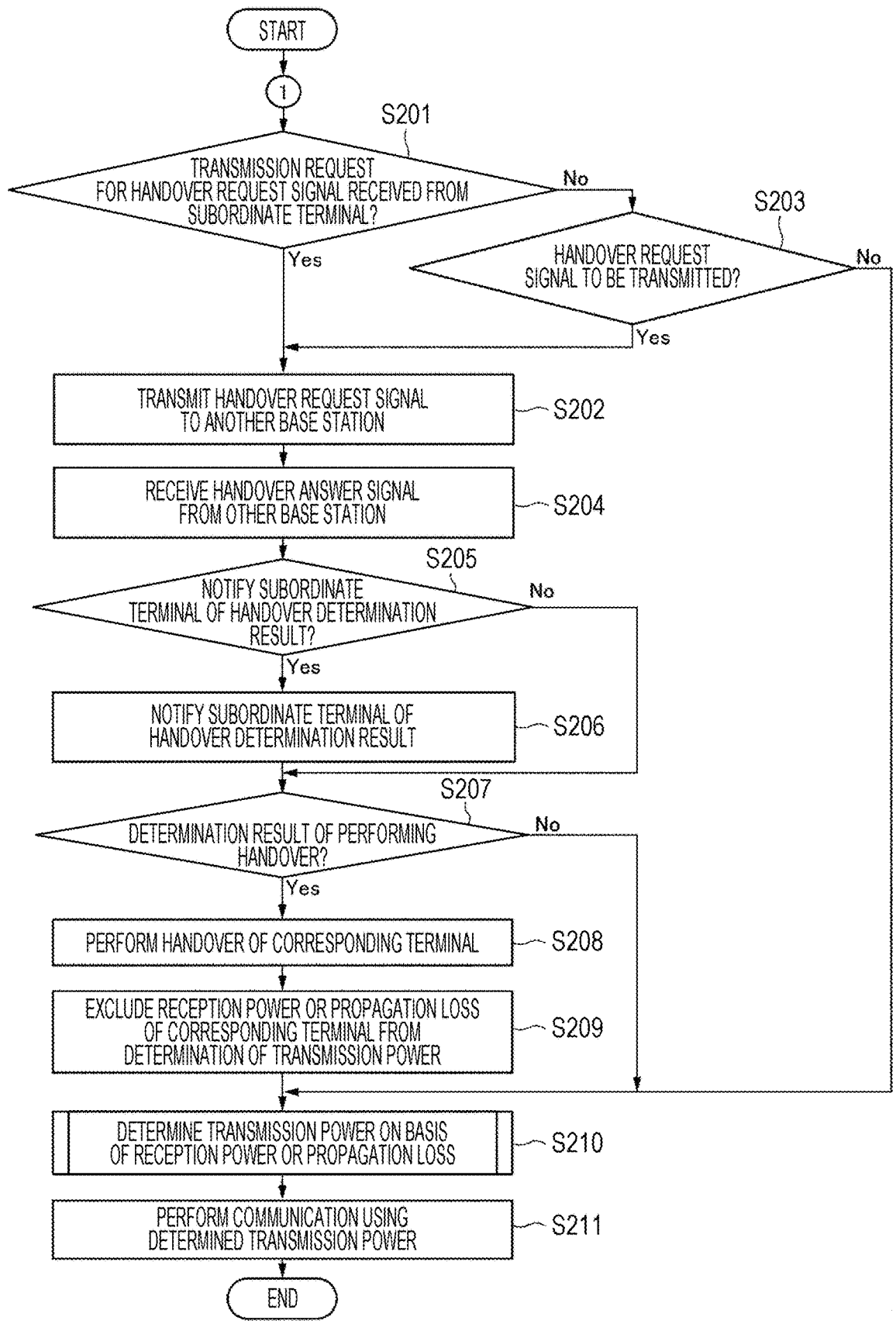
FIG. 14 is a flowchart illustrating a flow of communication processing executed by a base station AP-a.

In other words, in the base station AP-a, the processing of the initial setup phase (S101 to S103 in FIG. 4), the minimization of the transmission power (S104 in FIG. 4), the test signal request phase (S105 to S107 in FIG. 4), and the test signal phase (S108 in FIG. 4) is performed, the reception power or the propagation loss is calculated and held (S109 in FIG. 4), and thereafter, the processing in and after step S201 in FIG. 14 is executed.

In the base station AP-a, processing of steps S201 to S206 is executed in the handover request phase (S8).

Specifically, the control unit 101 determines whether a transmission request for a handover request signal has been received from the subordinate terminal STA-a1 (S201).

In a case where it is determined in the determination processing of step S201 that the transmission request for the handover request signal has been received, the control unit 101 transmits the handover request signal to the other base station AP-b (S202).

On the other hand, in a case where it is determined in the determination processing of step S201 that the transmission request for the handover request signal has not been received, the control unit 101 determines whether to transmit the handover request signal (S203).

In a case where it is determined in the determination processing of step S203 that the handover request signal is to be transmitted, the control unit 101 transmits the handover request signal to the other base station AP-b (S202).

When the processing of step S202 ends, the processing proceeds to step S204. In step S204, the control unit 101 receives a handover answer signal transmitted from the other base station AP-b.

Then, the control unit 101 determines whether to notify the subordinate terminal STA-a1 of a handover determination result included in the handover answer signal (S205).

In a case where it is determined in the determination processing of step S205 that the handover determination result is to be notified, the control unit 101 notifies the terminal STA-a1 of the handover determination result (S206).

In a case where the processing of step S206 ends or it is determined in the determination processing of step S205 that notification of the handover determination result is not to be provided, the handover request phase is completed.

Subsequently, in the base station AP-a, processing of steps S207 to S208 is executed in the handover phase (S9).

Specifically, the control unit 101 determines whether the handover determination result is a determination result of performing handover (S207).

In a case where it is determined in the determination processing of step S207 that it is the determination result of performing the handover, the control unit 101 performs the handover of the corresponding terminal STA-b1 (S208).

When the processing of step S208 ends, the handover phase is completed, and processing of steps S209 to S211 is executed.

Specifically, the control unit 101 excludes the reception power information or the propagation loss information of the corresponding terminal STA-b1 from the determination of the transmission power (S209). Furthermore, the control unit 101 determines transmission power on the basis of the held reception power information or propagation loss information (S210). Then, the control unit 101 performs communication using the determined transmission power (S211). Note that details of this transmission power control are as described above with reference to the flowchart of FIG. 7.

Note that, in a case where it is determined in the determination processing of step S203 that the handover request signal is not to be transmitted, or in a case where it is determined in the determination processing of step S207 that it is the determination result of not performing the handover, the subsequent steps are skipped, the processing proceeds to step S210, and the processing of steps S210 and S211 is executed.

In this case, since the handover of the terminal STA-b1 is not performed, in determining the transmission power, the determination is made without excluding the transmission power information or the propagation loss information of the terminal STA-b1, and the transmission power is controlled, similarly to the processing illustrated in the flowchart of FIG. 4.

Communication Processing of Base Station AP-b

Next, a flow of communication processing executed by (the control unit 101 of) the base station AP-b in the sequence of FIG. 13 will be described with reference to the flowchart of FIG. 15.

Note that, when the communication processing of the base station AP-b in the sequence of FIG. 13 is compared with the communication processing of the base station AP-b in the sequence of FIG. 3, the processing from steps S121 to S125 is the same and the subsequent processing is different in the processing illustrated in the flowchart of FIG. 5. That is, here, FIG. 5 and FIG. 15 are associated with each other by a number "2", and the flowchart of FIG. 15 illustrates processing executed subsequent to steps S121 to S125 of FIG. 5.

Figure 15:
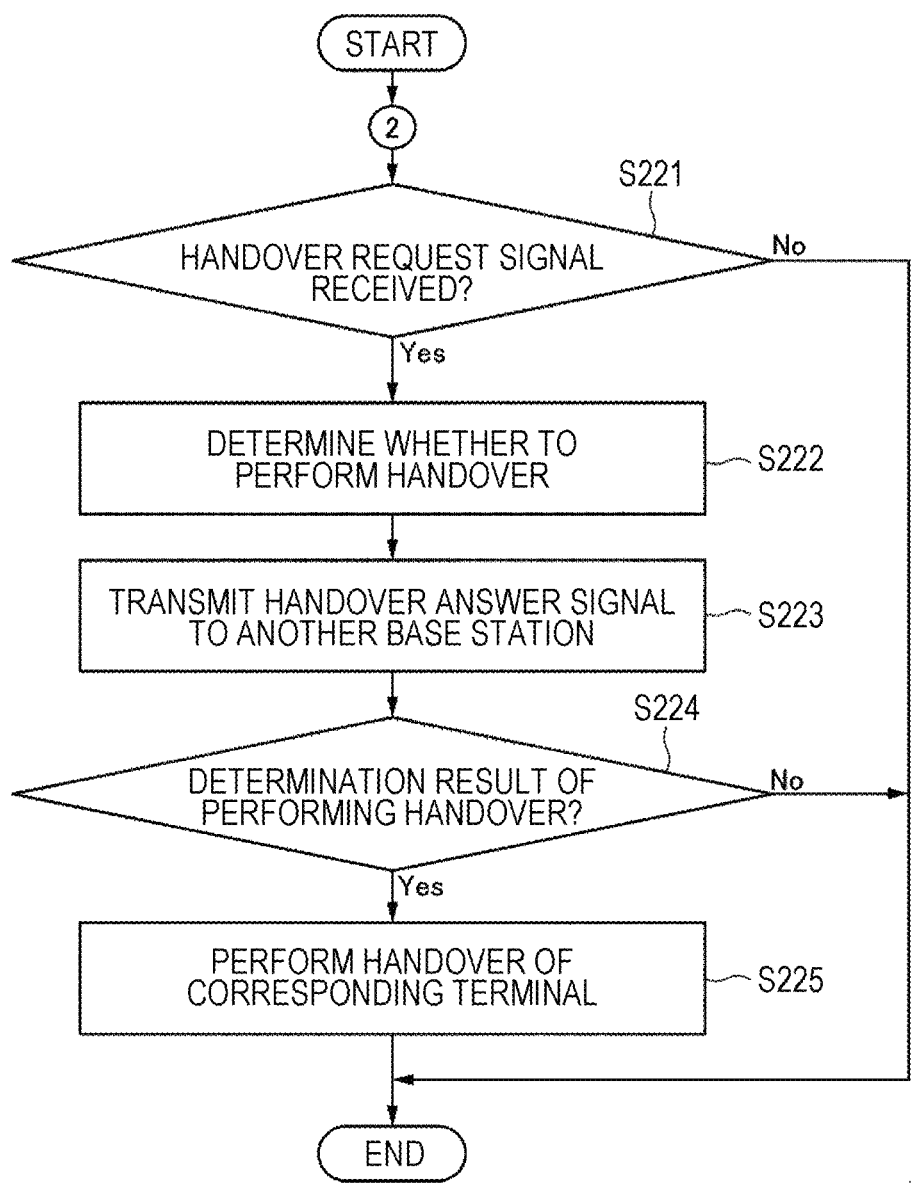
FIG. 15 is a flowchart illustrating a flow of communication processing executed by a base station AP-b.

In the base station AP-b, the processing of the initial setup phase (S121 to S123 in FIG. 5), the test signal request phase (S124 in FIG. 5), and the test signal phase (S125 in FIG. 5) is performed, the test signal trigger signal is transmitted to the subordinate terminal STA-b1, STA-b2 (S125 in FIG. 5), and thereafter, the processing in and after step S221 in FIG. 15 is executed.

In the base station AP-b, processing of steps S221 to S223 is executed in the handover request phase (S8).

Specifically, the control unit 101 determines whether a handover request signal has been received from the other base station AP-a (S221).

In a case where it is determined in the determination processing of step S221 that the handover request signal has been received, the control unit 101 determines whether to perform handover (S222). Then, the control unit 101 transmits a handover answer signal including a handover determination result to the other base station AP-a (S223).

When the processing of step S223 ends, the handover request phase is completed. Subsequently, in the base station AP-b, processing of steps S224 to S225 is executed in the handover phase (S9).

Specifically, the control unit 101 determines whether the handover determination result is a determination result of performing the handover (S224).

In a case where it is determined in the determination processing of step S224 that it is the determination result of performing the handover, the control unit 101 performs the handover of the corresponding terminal STA-b1 (S225).

When the processing of step S225 ends, the handover phase is completed.

Note that, in a case where it is determined in the determination processing of step S221 that the handover request signal has not been received, steps S222 to S225 are skipped, and the handover request phase and the handover phase are not performed. Furthermore, in a case where it is determined in the determination processing of step S224 that it is a determination result of not performing the handover, step S225 is skipped, and the handover phase is not performed.

Communication Processing of Terminal STA

Next, a flow of communication processing executed by the terminal STA (the control unit 101 of STA-a1, STA-b1, STA-b2) in the sequence of FIG. 13 will be described with reference to the flowchart of FIG. 16.

Note that, when the communication processing of the terminal STA in the sequence of FIG. 13 is compared with the communication processing of the terminal STA in the sequence of FIG. 3, the processing from step S141 to step S148 is the same and the subsequent processing is different in the processing illustrated in the flowchart of FIG. 6. That is, here, FIG. 6 and FIG. 16 are associated with each other by a number "3", and the flowchart of FIG. 16 illustrates processing executed subsequent to steps S141 to S148 of FIG. 6.

Figure 16:
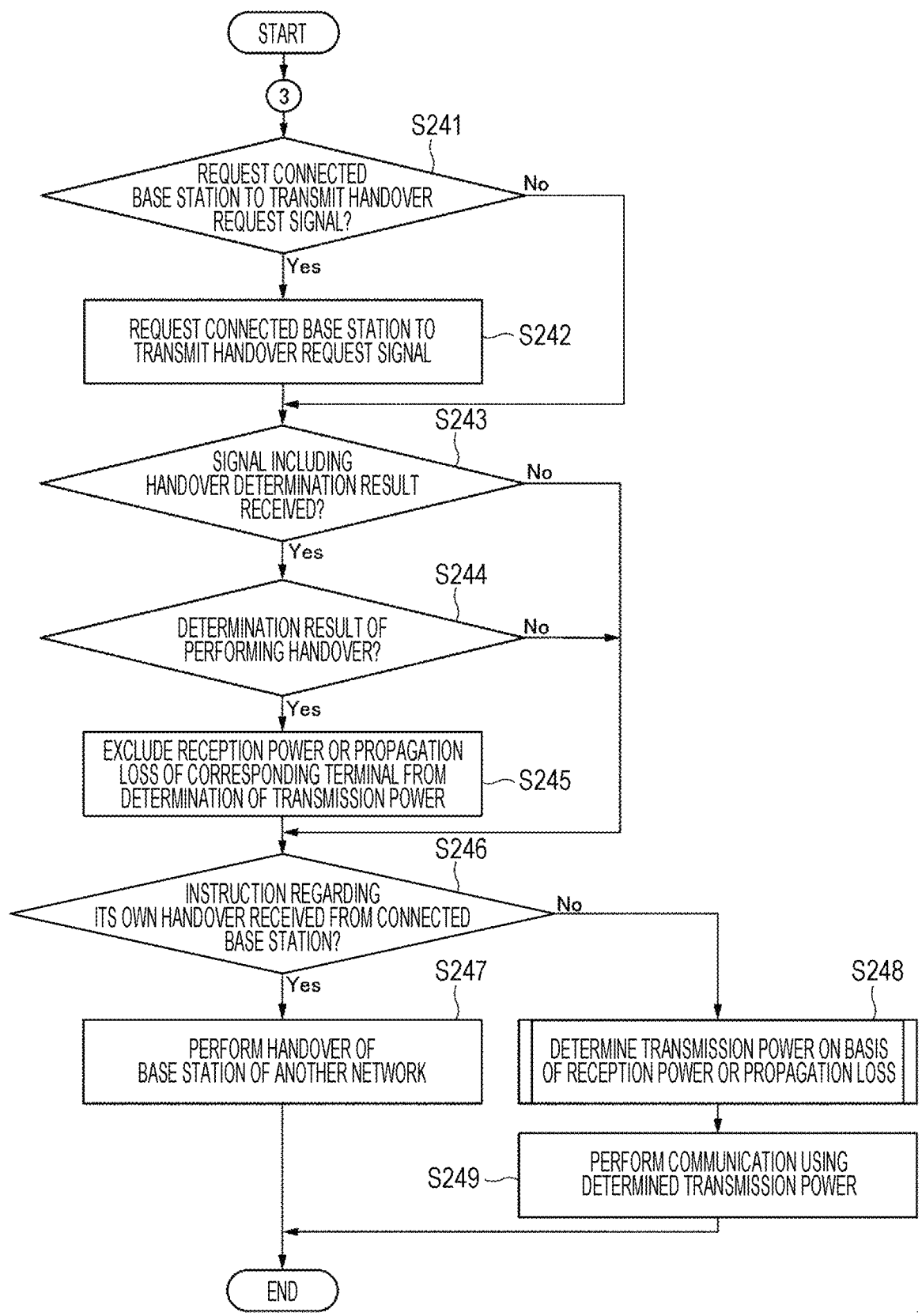
FIG. 16 is a flowchart illustrating a flow of communication processing executed by a terminal STA.

In other words, in the terminal STA, the processing of the initial setup phase (S141 in FIG. 6), the minimization of the transmission power (S142 in FIG. 6), the test signal request phase (S143 to S144 in FIG. 6), and the test signal phase (S145 to S147 in FIG. 6) is performed, the reception power or the propagation loss is calculated and held (S148 in FIG. 6), and thereafter, the processing in and after step S241 in FIG. 16 is executed.

In the terminal STA, processing of steps S241 to S242 is executed in the handover request phase (S8).

Specifically, the control unit 101 of the terminal STA-a1 determines whether to request the connected base station AP-a to transmit a handover request signal (S241).

In a case where it is determined in the determination processing of step S241 that the transmission of the handover request signal is to be requested, the control unit 101 of the terminal STA-a1 requests the connected base station AP-a to transmit the handover request signal (S242).

In a case where the processing of step S242 ends or it is determined in the determination processing of step S241 that the transmission of the handover request signal is not to be requested, the handover request phase is completed.

Subsequently, in the terminal STA, processing in and after step S243 is executed in the handover phase (S9).

Specifically, the control unit 101 of the terminal STA-a1 determines whether a signal including a handover determination result (a signal corresponding to a handover answer signal) has been received from the base station AP-a (S243).

In a case where it is determined in the determination processing of step S243 that the signal including the handover determination result has been received, the control unit 101 determines whether the handover determination result is a determination result of performing handover (S244).

In a case where it is determined in the determination processing of step S244 that it is the determination result of performing the handover, the control unit 101 of the terminal STA-a1 excludes the reception power information or the propagation loss information of the corresponding terminal STA-b1 from determination of transmission power (S245).

When the processing of step S245 ends, the processing proceeds to step S246. Furthermore, in a case where it is determined in the determination processing of step S243 that the signal including the handover determination result has not been received, or in a case where it is determined in the determination processing of step S244 that it is the determination result of not performing the handover, steps S244 to S245 or S245 are skipped, and the processing proceeds to step S246.

Then, the control unit 101 of the terminal STA-a1 determines whether an instruction regarding its own handover has been received from the connected base station AP-a (S246).

In a case where it is determined in the determination processing of step S246 that the instruction regarding its own handover has been received, the processing proceeds to step S247. The control unit 101 of the terminal STA-a1 performs handover to the base station AP-b of the other network BSS-b (S247).

Note that the control unit 101 of the terminal STA-b1 determines whether an instruction regarding its own handover has been received from the connected base station AP-b (S246), and in a case where it is determined that the instruction regarding its own handover has been received, the handover can be performed to the base station AP-a of the other network BSS-a (S247).

On the other hand, in a case where it is determined in the determination processing of step S246 that the instruction regarding its own handover has not been received, the processing proceeds to step S248. The control unit 101 of the terminal STA-a1 determines transmission power on the basis of the held reception power information or propagation loss information (S248). Then, the control unit 101 of the terminal STA-a1 performs communication using the determined transmission power (S249). Note that details of this transmission power control are as described above with reference to the flowchart of FIG. 7.

As described above, in the wireless communication system to which the present technology is applied, the terminal STA of the other network BSS in which the given interference can be large is accommodated in its own network BSS, and it is possible to minimize the interference given to the terminal STA of the other network BSS in a necessary and sufficient manner. Therefore, it is possible to increase a throughput of communication in the other network BSS by increasing a transmission opportunity of the terminal STA of the other network BSS and increasing a SINR thereof.

Furthermore, in the wireless communication system to which the present technology is applied, an increase in transmission power in desired communication is realized while suppressing interference given to the terminal STA of the other network BSS. Therefore, it is possible to increase a throughput of the desired communication by increasing a SINR in the desired communication. Moreover, in the wireless communication system to which the present technology is applied, it is possible to improve the throughput of communication in the other network BSS and the throughput of the desired communication, and to increase a throughput of the entire system.

Note that, also in the second embodiment, a configuration in which the base station AP-c that controls the base station AP-a and the base station AP-b is provided as illustrated in FIG. 12, may be adopted. In a case where a case of such a configuration is adopted, a signal to be transmitted and received between the base station AP-a and the base station AP-b is transmitted and received via the base station AP-c, and the signal to be transmitted and received can include a signal such as the handover request signal transmitted in the handover request phase and the like.

4. Modified Examples

Other Configuration Examples

In the above description, in the communication device 10 (FIG. 2), the control unit 101 (FIG. 2) has been described as controlling the transmission power and the operation regarding the initial setup phase, the test signal request phase, the test signal phase, the handover request phase, the handover phase, and the like. However, (the wireless control unit 111 of) the communication unit 102 configured as a communication module (communication device) and the like may have these control functions.

Furthermore, the configuration of the communication device 10 in FIG. 2 described above is an example, and a new component may be added or a component may be deleted.

For example, in the communication device 10 of FIG. 2, the data processing unit 112 provided outside (not inside but outside) the communication unit 102 may exchange data with the modulation/demodulation unit 113 in accordance with the control of the control unit 101. Alternatively, without providing the wireless control unit 111 inside the communication unit 102, the communication unit 102 may perform wireless communication in accordance with the control of the control unit 101. On the other hand, the control unit 101 provided inside (not outside but inside) the communication unit 102 may control wireless communication instead of the wireless control unit 111.

Note that the terminal STA as the communication device 10 can be configured as, for example, an electronic device having a wireless communication function, such as a smartphone, a tablet terminal, a mobile phone, a personal computer, a digital camera, a game machine, a television receiver, a wearable terminal, or a speaker device.

Furthermore, the communication device 10 may be configured as a part of a device configuring the base station AP or the terminal STA (for example, a communication module, a communication chip, and the like). In other words, the communication device 10 is not limited to an electronic device, and includes a communication module, a chip, and the like (in this case, the communication device 10 does not include the antenna 118).

Furthermore, in the above-described embodiments, the system means a set of a plurality of components (devices and the like).

Note that embodiments of the present technology are not limited to the above-described embodiments, and various modifications can be made without departing from the scope of the present technology.

Furthermore, the present technology can have the following configurations.

(1)

A communication device including:

a control unit that transmits a second signal including a transmission request for a first signal for measuring reception power or propagation loss to another communication device, receives the first signal transmitted from the another communication device, measures the reception power or the propagation loss on the basis of the received first signal, and controls transmission power on the basis of the measured reception power or propagation loss.

(2)

The communication device according to (1), in which the control unit controls the transmission power on the basis of first reception power or first propagation loss measured from the first signal and second reception power or second propagation loss measured from desired communication.

(3)

The communication device according to (2), in which the control unit performs control to minimize the transmission power before measuring the first reception power or the first propagation loss from the first signal.

(4)

The communication device according to (3), in which the control unit performs control to increase the transmission power in a case where the first propagation loss is larger than the second propagation loss.

(5)

The communication device according to any one of (1) to (4), in which the control unit performs control to further exchange acceptable interference information regarding acceptable interference and threshold information regarding a threshold used in the control of the transmission power with the another communication device.

(6)

The communication device according to any one of (1) to (5), in which the second signal includes transmission power information regarding transmission power used by the another communication device.

(7)

The communication device according to any one of (1) to (6), in which the second signal includes group identifier information regarding an identifier of a group to which the another communication device belongs.

(8)

The communication device according to any one of (1) to (7), in which the second signal includes group resource information regarding a resource allocated for every group to which the another communication device belongs.

(9)

The communication device according to any one of (1) to (8), in which the control unit requests a second another communication device to change a connection destination of a first another communication device that has transmitted the first signal on the basis of a measurement result of the first signal, and accommodates the first another communication device that has been requested to change the connection destination.

(10)

The communication device according to any one of (1) to (9), in which the communication device is configured as a base station or its subordinate terminal, transmits the second signal to another base station in a case of being configured as the base station, and transmits the second signal to a connected base station in a case of being configured as the terminal.

(11)

A communication device including:

a control unit that performs control to receive a second signal transmitted from a third another communication device and including a transmission request for a first signal for measuring reception power or propagation loss, and transmit a third signal including the transmission request for the first signal to a first another communication device on the basis of the received second signal.

(12)

The communication device according to (11), in which the control unit performs control to exchange acceptable interference information regarding acceptable interference and threshold information regarding a threshold used in control of the transmission power with the third another communication device.

(13)
The communication device according to (11) or (12),
in which the third signal is a signal for transmitting the first signal in an OFDMA system to the first another communication device, and includes resource information regarding a resource used for transmission in the OFDMA system.

(14)
The communication device according to any one of (11) to (13),
in which the third signal includes information that is the same as or corresponds to at least a part of information included in the second signal, and
the same or corresponding information includes at least transmission power information regarding transmission power used when the first another communication device transmits the first signal or group identifier information regarding an identifier of a group to which the first another communication device belongs.

(15)
The communication device according to any one of (11) to (14),
in which the control unit changes a connection destination of the first another communication device on the basis of a request to change the connection destination from the third another communication device.

(16)
The communication device according to any one of (11) to (15),
in which the communication device is configured as a base station,
receives the second signal transmitted from another base station as the third another communication device, and
transmits the third signal to a subordinate terminal as the first another communication device on the basis of the received second signal.

(17)
A communication device including:
a control unit that performs control to
receive a third signal transmitted from a second another communication device and including a transmission request for a first signal for measuring reception power or propagation loss, and
transmit the first signal to a third another communication device on the basis of the received third signal.

(18)
The communication device according to (17),
in which the control unit transmits the first signal in a configuration having a plurality of different bandwidths according to an OFDMA system on the basis of information included in the third signal.

(19)
The communication device according to (17) or (18),
in which the third signal includes transmission power information regarding transmission power, resource information regarding a resource, and group identifier information regarding an identifier of a group, and
the control unit transmits the first signal including the group identifier information on the basis of the transmission power information and the resource information.

(20)
The communication device according to any one of (17) to (19),
in which the communication device is configured as a terminal,
receives the third signal transmitted from a connected base station as the second another communication device, and
transmits the first signal to another base station or a subordinate terminal of the another base station as the third another communication device on the basis of the received third signal.

REFERENCE SIGNS LIST

10 Communication device
101 Control unit
102 Communication unit
103 Power supply unit
111 Wireless control unit
112 Data processing unit
113 Modulation/demodulation unit
114 Signal processing unit
115 Channel estimation unit
116, 116-1 to 116-N Wireless interface unit
117, 117-1 to 117-N Amplifier unit
118, 118-1 to 118-N Antenna

The invention claimed is:

1. A communication device comprising:
a controller that performs control to
transmit a second signal including a transmission request for a first signal for measuring reception power or propagation loss to a second another communication device,
receive the first signal transmitted from a first another communication device,
measure the reception power or the propagation loss on a basis of the received first signal, and
control transmission power on a basis of the measured reception power or propagation loss.

2. The communication device according to claim 1,
wherein the controller controls the transmission power on a basis of first reception power or first propagation loss measured from the first signal and second reception power or second propagation loss measured from desired communication.

3. The communication device according to claim 2,
wherein the controller performs control to minimize the transmission power before measuring the first reception power or the first propagation loss from the first signal.

4. The communication device according to claim 3,
wherein the controller performs control to increase the transmission power in a case where the first propagation loss is larger than the second propagation loss.

5. The communication device according to claim 1,
wherein the controller performs control to further exchange acceptable interference information regarding acceptable interference and threshold information regarding a threshold used in the control of the transmission power with the another communication device.

6. The communication device according to claim 1,
wherein the second signal includes transmission power information regarding transmission power used by the second another communication device.

7. The communication device according to claim 1,
wherein the second signal includes group identifier information regarding an identifier of a group to which the second another communication device belongs.

8. The communication device according to claim 7, wherein the second signal includes group resource information regarding a resource allocated for every group to which the second another communication device belongs.

9. The communication device according to claim 1, wherein the controller requests the second another communication device to change a connection destination of the first another communication device that has transmitted the first signal on a basis of a measurement result of the first signal, and accommodates the first another communication device that has been requested to change the connection destination.

10. The communication device according to claim 1, wherein the communication device is configured as a base station or its subordinate terminal, transmits the second signal to the second another base station in a case of being configured as the base station, and transmits the second signal to a connected base station in a case of being configured as the terminal.

11. The communication device according to claim 1, wherein the first signal includes transmission power information and group identifier information that are the same as or correspond to information included in the second signal.

12. The communication device according to claim 1, wherein the first signal includes information regarding an identifier of a terminal that induces transmission of a test signal and information regarding a resource used by the terminal.

13. The communication device according to claim 12, wherein the information regarding the identifier of the terminal only identifies a terminal that can use a transmission power specified by the first signal and that can maintain a constant accuracy with respect to the transmission power.

14. The communication device according to claim 12, wherein the information regarding a resource used by the terminal includes frequency resource information, wherein the frequency resource information indicates a part of a frequency band of a frequency channel, or indicates a center frequency and a frequency width.

15. The communication device according to claim 12, wherein the first signal is transmitted using a format of a high efficiency trigger based physical layer convergence protocol (PLCP) protocol data unit defined by IEEE 802.11.

16. The communication device according to claim 12, wherein the first signal is transmitted including group identifier information specified by the second signal.

17. A communication device comprising:

a controller that performs control to receive a second signal transmitted from a third another communication device and including a transmission request for a first signal for measuring reception power or propagation loss, and transmit a third signal including the transmission request for the first signal to a first another communication device on a basis of the received second signal.

18. The communication device according to claim 17, wherein the controller performs control to exchange acceptable interference information regarding acceptable interference and threshold information regarding a threshold used in control of transmission power with the third another communication device.

19. The communication device according to claim 17, wherein the third signal is a signal for transmitting the first signal in an OFDMA system to the first another communication device, and includes resource information regarding a resource used for transmission in the OFDMA system.

20. A communication device comprising:

a controller that performs control to receive a third signal transmitted from a second another communication device and including a transmission request for a first signal for measuring reception power or propagation loss, and transmit the first signal to a third another communication device on a basis of the received third signal.

* * * * *